United States Patent [19]

Lennington et al.

[11] 4,025,791
[45] May 24, 1977

[54] OBJECT IDENTIFICATION SYSTEM

[75] Inventors: John W. Lennington, Belleville; Stanley R. Sternberg, Ypsilanti, both of Mich.

[73] Assignee: Kilo Corporation, Detroit, Mich.

[22] Filed: Aug. 12, 1975

[21] Appl. No.: 603,927

[52] U.S. Cl. .............................. 250/341; 250/338; 343/6 ND; 343/6.8 R

[51] Int. Cl.² ........................................ G01S 9/56

[58] Field of Search .......... 250/338, 340, 341, 330; 343/6 ND, 6.8 R

[56] References Cited

UNITED STATES PATENTS

| | | | |
|---|---|---|---|
| 3,104,478 | 9/1963 | Strauss et al. | 343/6 ND X |
| 3,182,930 | 5/1965 | Randolph, Jr. et al. | 343/6.8 R X |
| 3,299,424 | 1/1967 | Vinding | 343/6.8 R X |
| 3,750,163 | 7/1973 | Hecker | 343/6.8 R X |
| 3,833,812 | 9/1974 | Reilly et al. | 250/330 |
| 3,859,624 | 1/1975 | Kriofsky et al. | 343/6.8 R X |

*Primary Examiner*—Archie R. Borchelt
*Attorney, Agent, or Firm*—Harness, Dickey & Pierce

[57] ABSTRACT

A transponder/interrogator system for remotely identifying objects. The interrogator emits infrared pulses to activate and remotely clock the transponder. Upon such activation, the transponder emits in synchronism with the interrogator pulse a unique code in the form of infrared pulses in accordance with a program stored in a recirculating shift register. The interrogator receives the infrared pulses from the transponder and may be associated with various code utilization devices as described herein.

57 Claims, 15 Drawing Figures

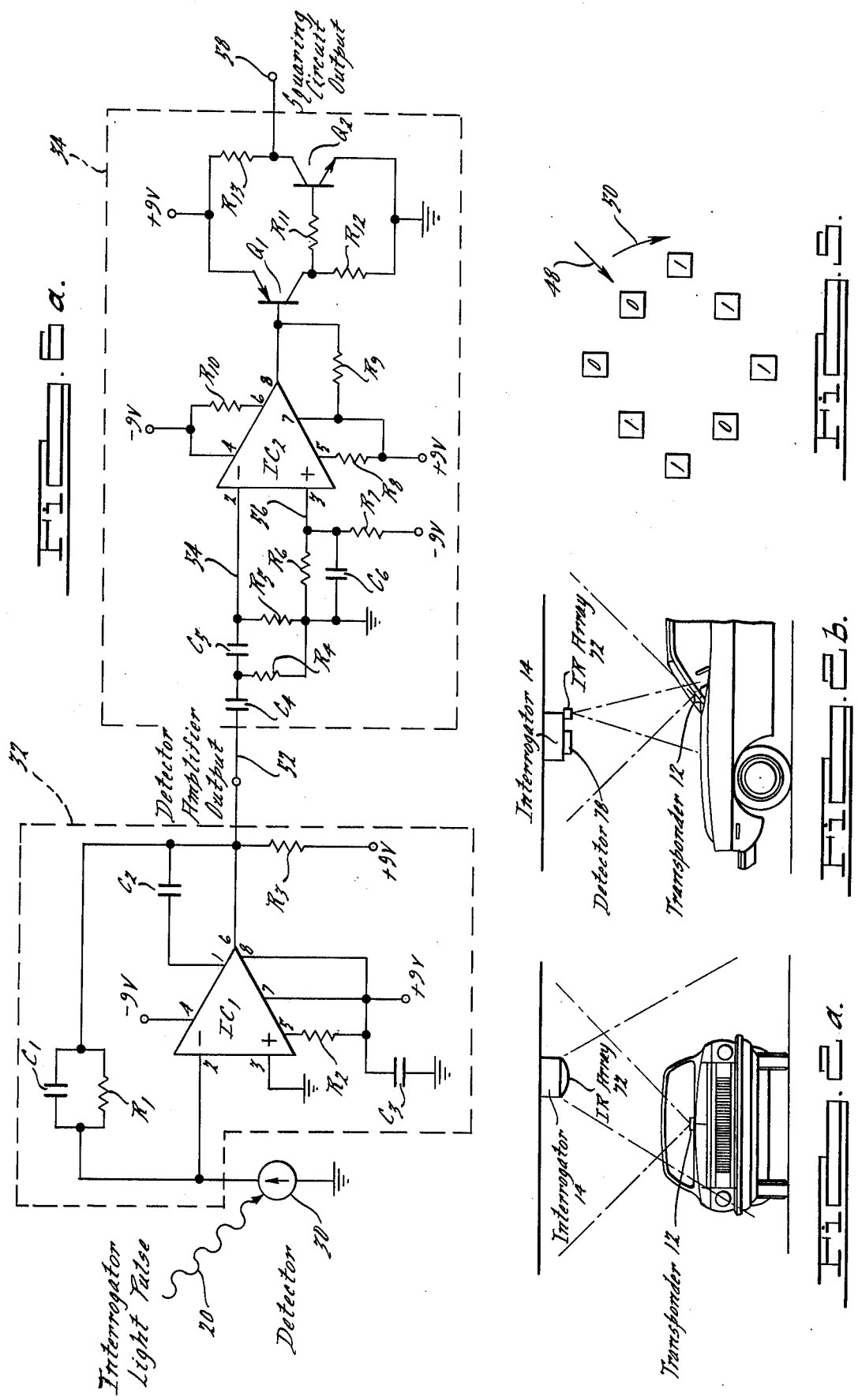

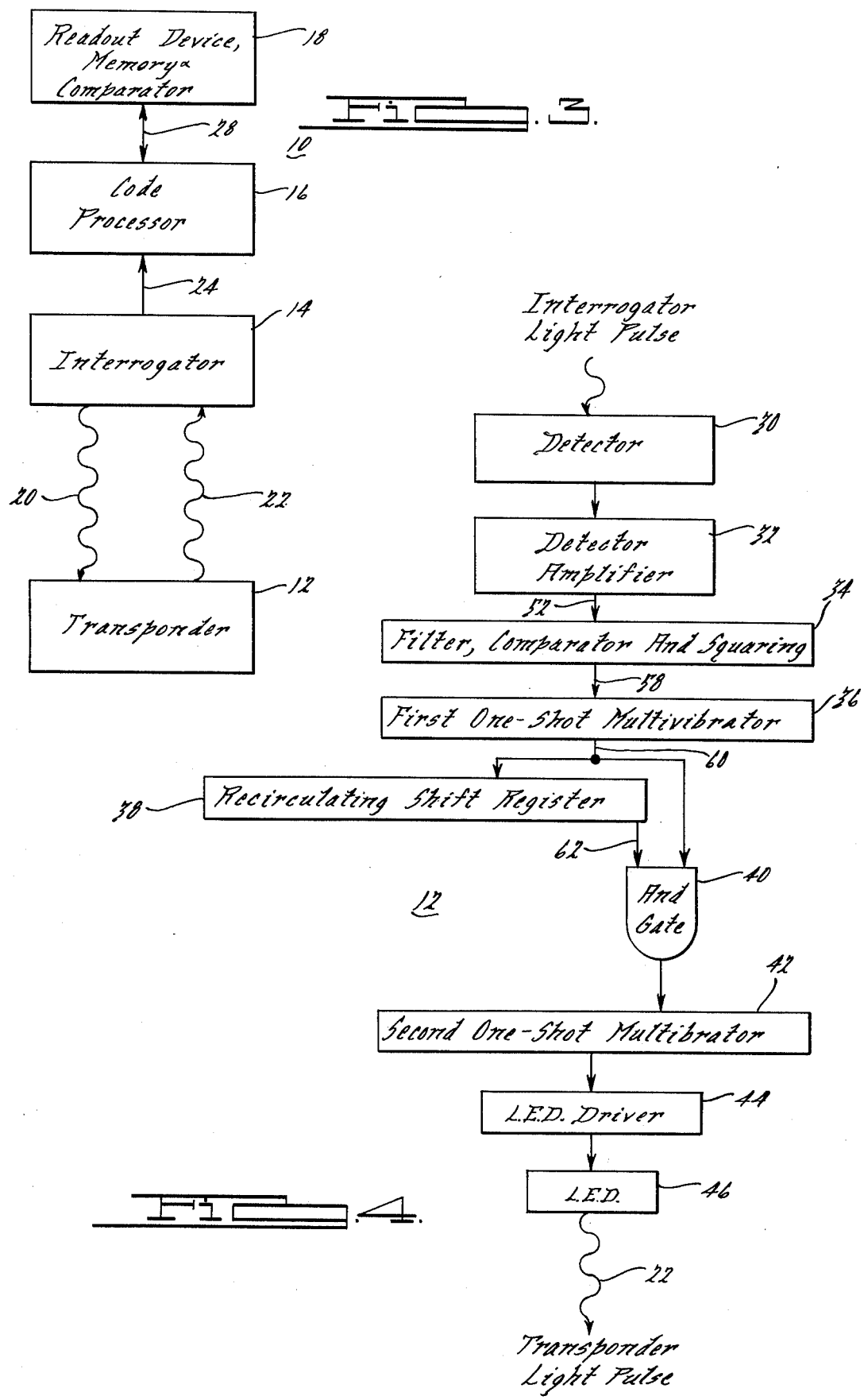

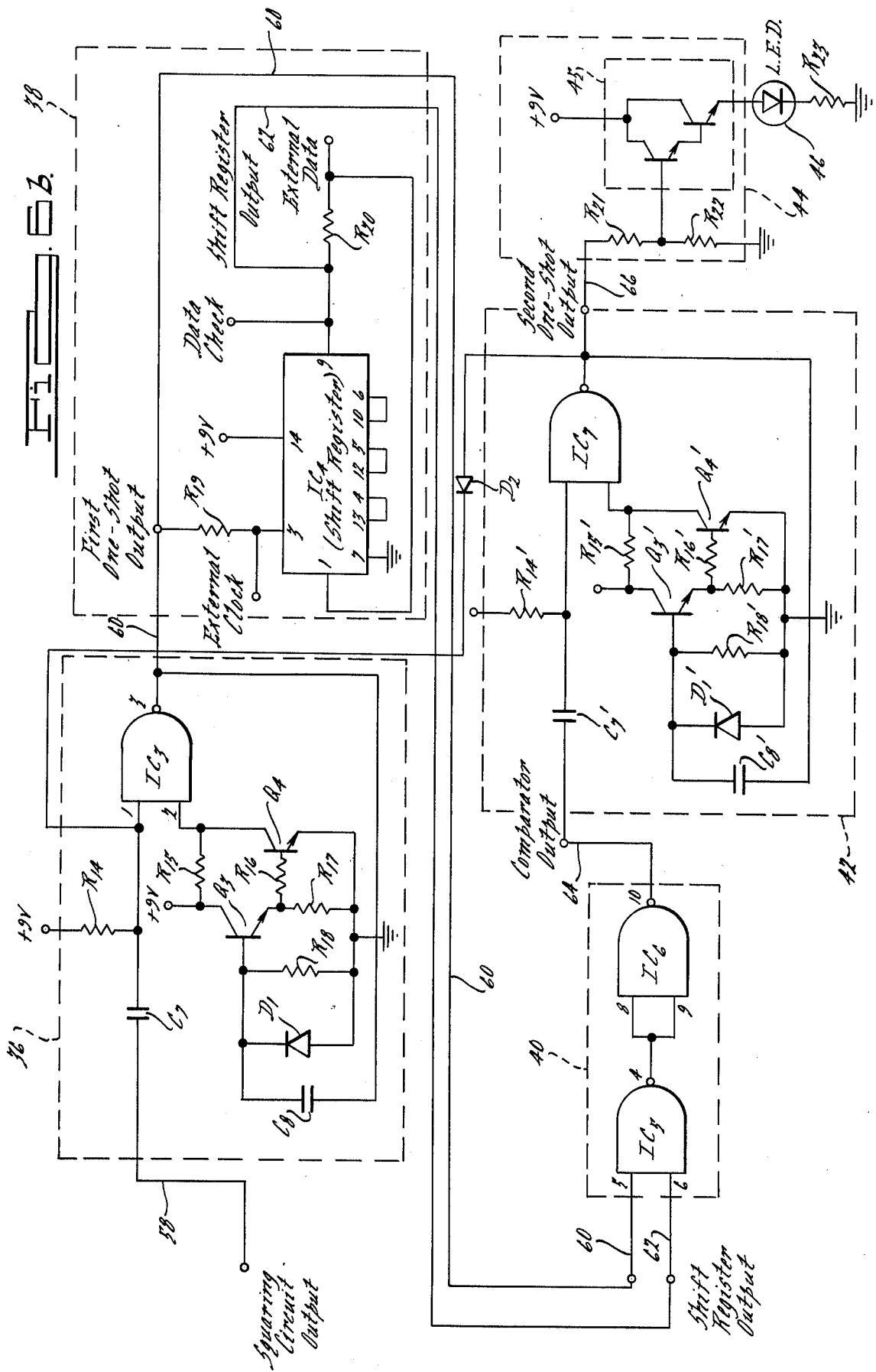

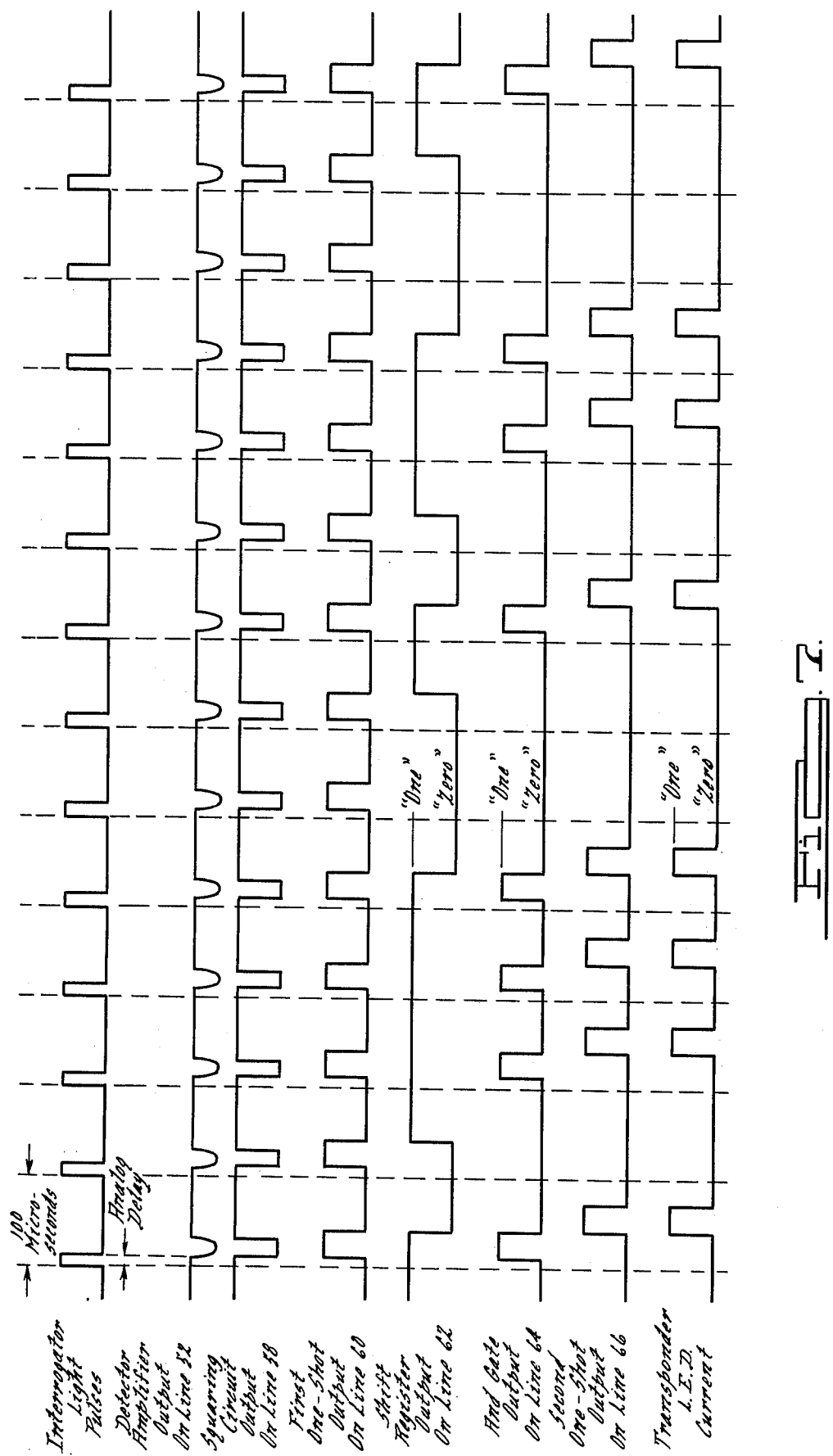

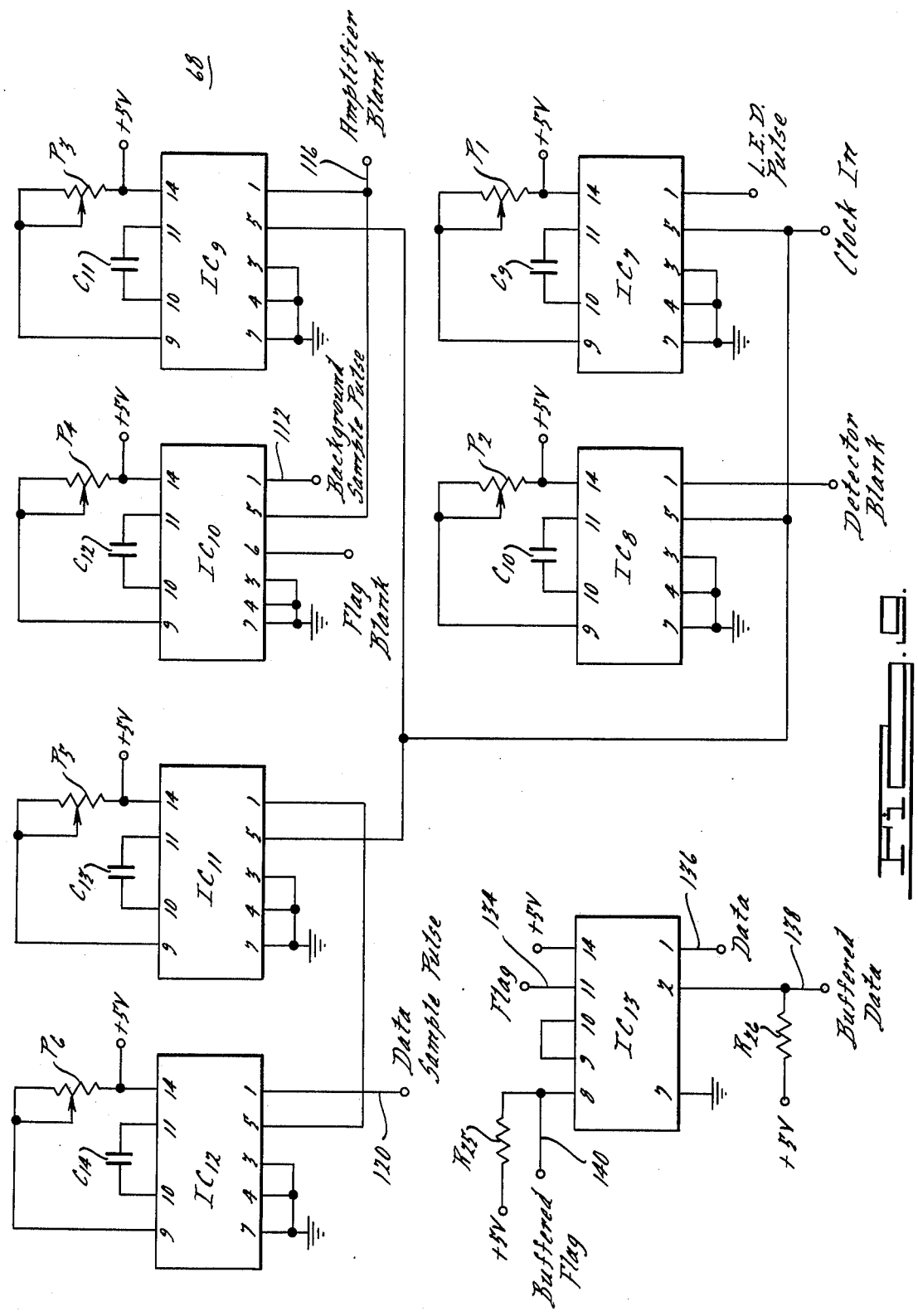

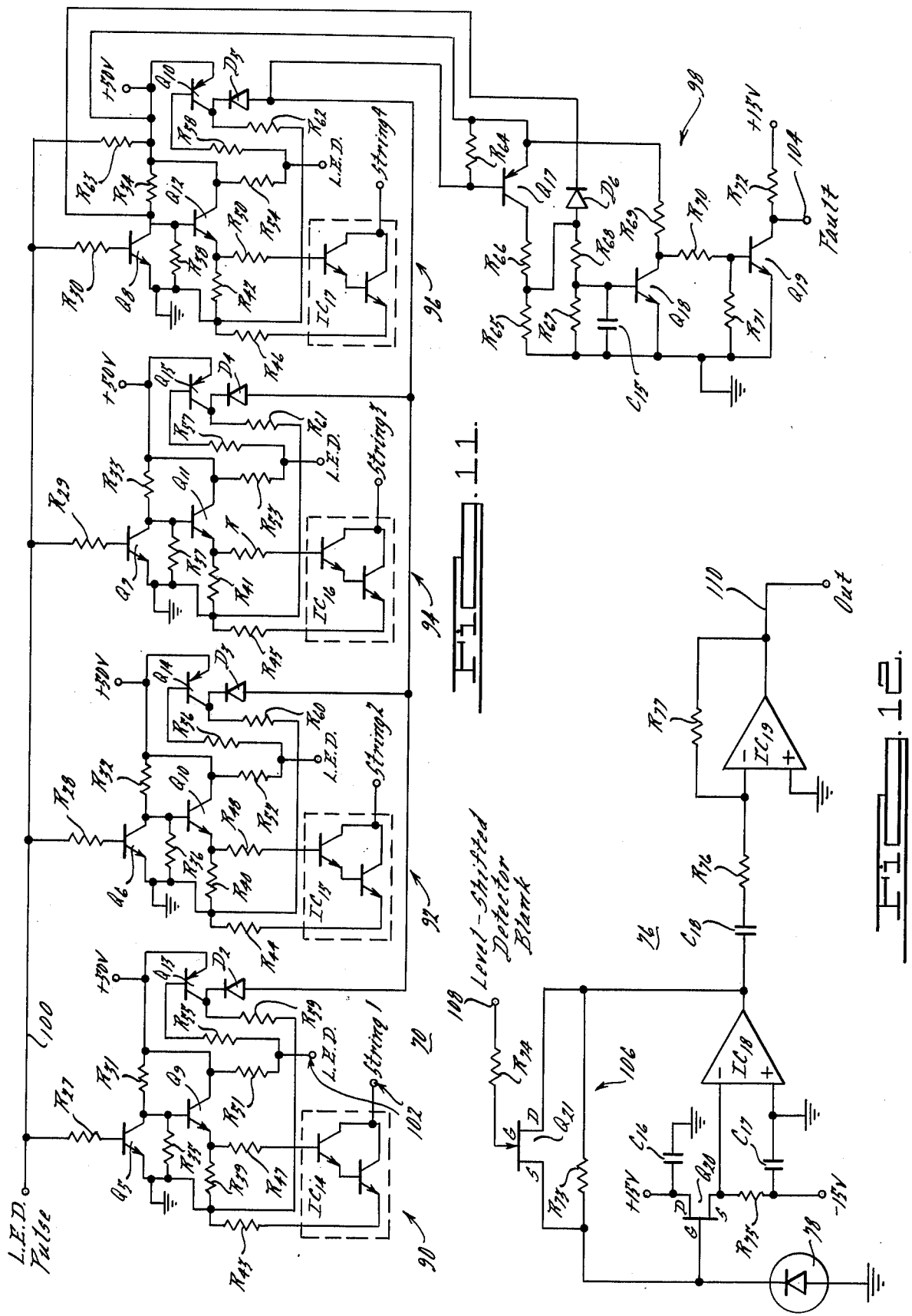

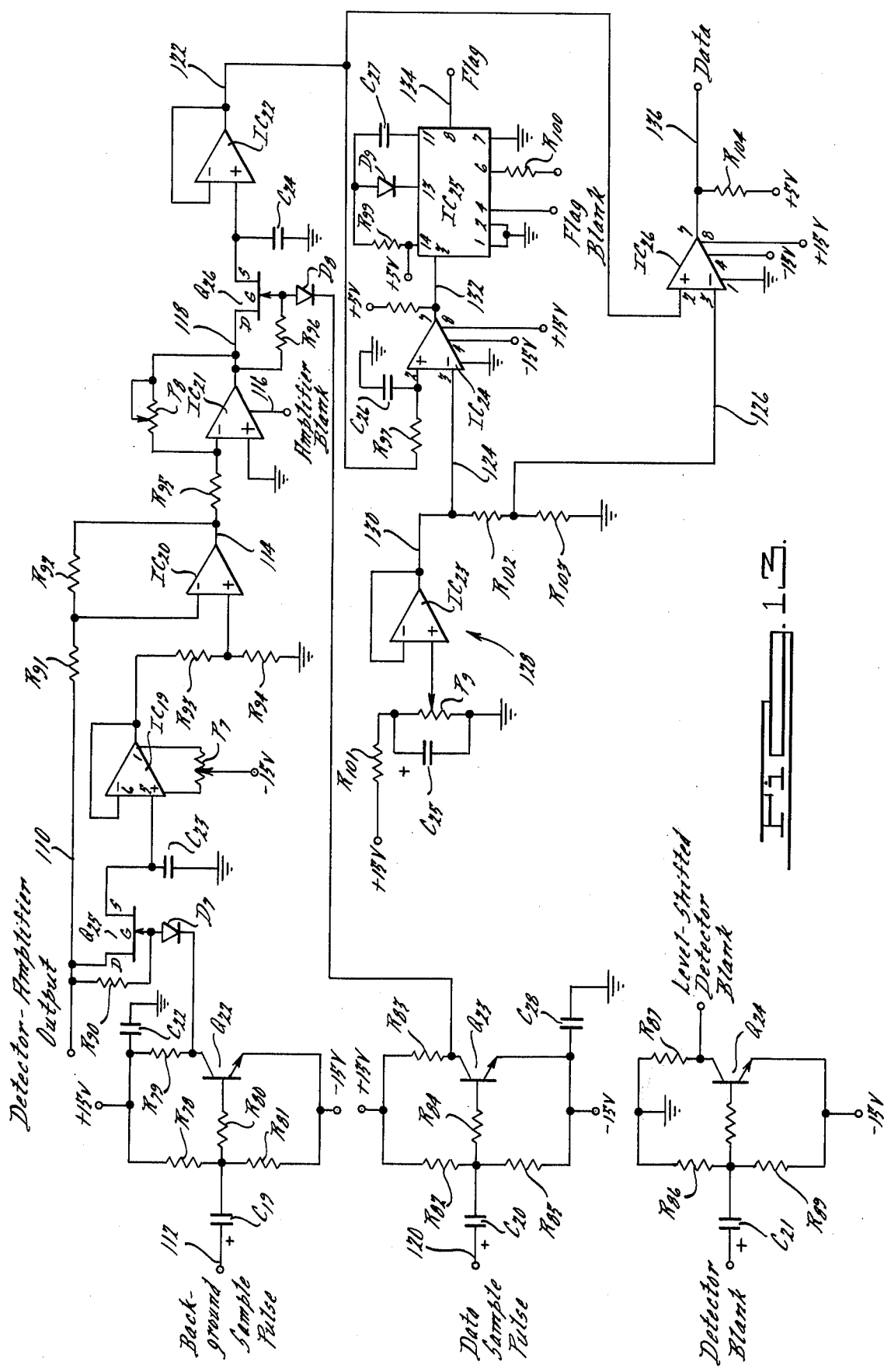

OBJECT IDENTIFICATION SYSTEM

BACKGROUND AND SUMMARY OF THE INVENTION

The present invention relates to a system for remotely identifying an object. In the form disclosed herein, the remote identifying system is adapted to identify any object which may carry a transponder of the type disclosed herein in a position so that the transponder is in infrared light communication with an interrogator. One particularly useful application of the remote identifying system of this invention is to identify automobiles as they enter and depart a parking structure or the like so that their entry and departure may be recorded and their identification checked against a compilation of authorized vehicles. Advantageously, the system of the present invention eliminates the usual necessity of stopping the vehicle to obtain a ticket or use another authorizing device such as a machine-readable card. In the past, many systems have been suggested for remotely identifying objects. Generally, the systems can be classified into two general classes, (1) passive device systems, and (2) active device systems. The passive device systems may use labels or other structures on the object which may be read or which may cooperatively function with an integrator to yield interrogator identifying code. Generally, devices for reading labels such as pattern recognition systems are costly and complex, and as a result, do not lend themselves to many applications in which object identification without human assistance would be desirable. Passive device readers such as those using structures which are selectively resonant with ultrasonic vibrations or high frequency electromagnetic waves have the disadvantages of requiring an inventory of a large number of unique passive structures and very precise manufacture of the passive structures. There are further limitations relative to the number of unique codes which can be stored or transferred economically in the available time.

Active device object identification systems may be classified in the following categories: (1) high frequency or radio frequency electromagnetic communicators, (2) light beam communicators, and (3) electromagnetic field communicators. The radio frequency devices have the disadvantage of requiring compliance with Federal Communications System's rules and the further disadvantage of susceptibility to radio frequency interference. This susceptibility as well as the requirement for selectivity dictates the use of highly directional receiving and transmitting antennae. The magnetic field devices are difficult to implement due to the shielding of the steel bodies of automobiles and the existence of strong time-varying, interfering magnetic fields from generators and other devices which are associated with the automobile.

The object identification system of the present invention avoids many of the difficulties of the prior art identification systems through the use of unique optical and electronic structures and methods. The transponder of the object identification system of this invention can operate on its self-contained power source for at least 6 months without replenishment, requires no attention from the carrier of the transponder to emit its identifying code, is physically small, e.g., smaller than or equal in size to a cigarette pack, so that it may be carried by a large variety of small objects, and is capable of transmitting information rapidly enough so that, for example, an 18-bit binary number can be received several times by an interrogator at a fixed location as the object passes the location of the interrogator at speeds as high as 60 miles per hour, thusly providing redundant interrogation even at high entry speed.

As previously indicated, the remote identifying system of this invention is especially useful as a means for identifying vehicles as they enter or exit a parking facility. Presently, a number of different methods are in commercial use for identifying vehicles as they enter a parking facility. One such system is to provide each authorized vehicle with a sticker or other label which may be viewed by an attendant at the entrance of the parking facility. That method for identifying vehicles has the advantage that the driver is not required to stop the vehicle as it enters the parking facility but has the decided disadvantage of the employ and constant attention of a parking attendant. This system is subject to human error and attendant inattention or dishonesty so that unauthorized vehicles or vehicles with expired leases may be allowed to enter. Another commercial system employs magnetic cards which the driver is required to insert into a slot in a card receptor at the entrance to the parking facility. The driver must stop his vehicle, thereby slowing the rate of entry of vehicles into the parking facility and inconveniencing the driver. The slow entry rate complicates the provision for traffic at the entry to the parking facility and often necessitates additional parking facility entrances to accommodate the slow entry rate. Accordingly, the cost of the parking facility is increased.

The object identifying system of the present invention, when used to identify vehicles entering a parking facility, has the substantial advantage of providing rapid and accurate identification of vehicles without requiring the employ of an attendant at each entrance or the stopping of each vehicle at the entrance. Accordingly, the vehicle may enter the parking facility at a relatively high rate of speed, e.g. up to 30 miles per hour. Furthermore, this system provides a high degree of user convenience. In addition, the digital code used by the system of this invention permits automatic parking control, computer accounting, audit and vehicle inventory. For example, the digital code representing the vehicle entering the parking structure may be provided to a computer for automatic comparison to a compilation in the memory thereof of authorized vehicles, time recording, and vehicle entry and departure recording so as to provide accurate and highly reliable control of the access of the parking facility vehicle inventory and accounting.

In its preferred form, the object identifying system according to the present invention includes a transponder which is carried by the object to be identified and an interrogator which may be in a fixed position and is in optical communication with the transponder. Preferably, the transponder and the interrogator are capable of detecting and emitting light pulses, e.g. pulses in the infrared band. The transponder is provided with a memory which stores a digital code which uniquely identifies the object carrying the transponder. In the preferred embodiment, the memory of the transponder is a recirculating shift register which is programmed with the digital code. So as to avoid the necessity of an internal clock circuit in the transponder and to further avoid the complication of synchronizing the clock circuits of a transponder and an interrogator, the transponder is remotely clocked by the interrogator. This is accomplished by providing an interrogator which emits a sequence of light pulses at the clock frequency as determined by a clock circuit located in the interrogator or an associated computer which are received by the transponder and by providing means in the transponder to convert these light pulses to electrical clock pulses. The electrical clock pulses are provided to the clock terminal of the recirculating shift register of the transponder. Thus, as the interrogator emits its light pulses, the recirculating shift register will sequentially provide the binary code stored therein to its output terminal. The output terminal of the recirculating shift register of the transponder is connected to the circuitry which activates an infrared emitting device so as to transmit the binary code to the interrogator. In the preferred embodiment, the transponder introduces a delay between the receipt of the interrogator pulses and the emmision of a correlative transponder pulse so that the transponder pulses may be distinguished from reflected interrogator pulses. The remote clocking also provides an advantageous way of determining when pulses are validly received from a transponder and distinguishing those pulses from received extraneous infrared signals and from system noise in general.

Other novel and advantageous features are found in the object identification system of the present invention as will be apparent in view of the detailed description of the preferred embodiment.

BRIEF DESCRIPTION OF THE DRAWINGS

FIGS. 2a and 2b are further views of the transponder, as it is positioned on the upper surface of the dashboard of a vehicle, and the interrogator shown in FIG. 1;

FIG. 3 is a block diagram of the object identification system of the present invention;

FIG. 4 is a block diagram of the transponder of the object identification system of the present invention;

FIG. 5 is an illustration of the position of the binary code in the recirculating shift register of the transponder of FIG. 4;

FIGS. 6a and 6b are a circuit diagram of the transponder shown in FIG. 4;

FIG. 7 is a chart showing the nature of the signals generated within the transponder of the object identification system according to the present invention;

FIG. 8 is a block diagram of the interrogator of the object identification system of the present invention;

FIG. 11 is a circuit diagram of the LED driver of the interrogator of FIG. 8;

FIG. 12 is a circuit diagram of the detector amplifier of the interrogator of FIG. 8; and FIG. 13 is a circuit diagram of the signal processing circuit of the interrogator of FIG. 8.

DETAILED DESCRIPTION OF THE PREFERRED EMBODIMENT

Figure 1:
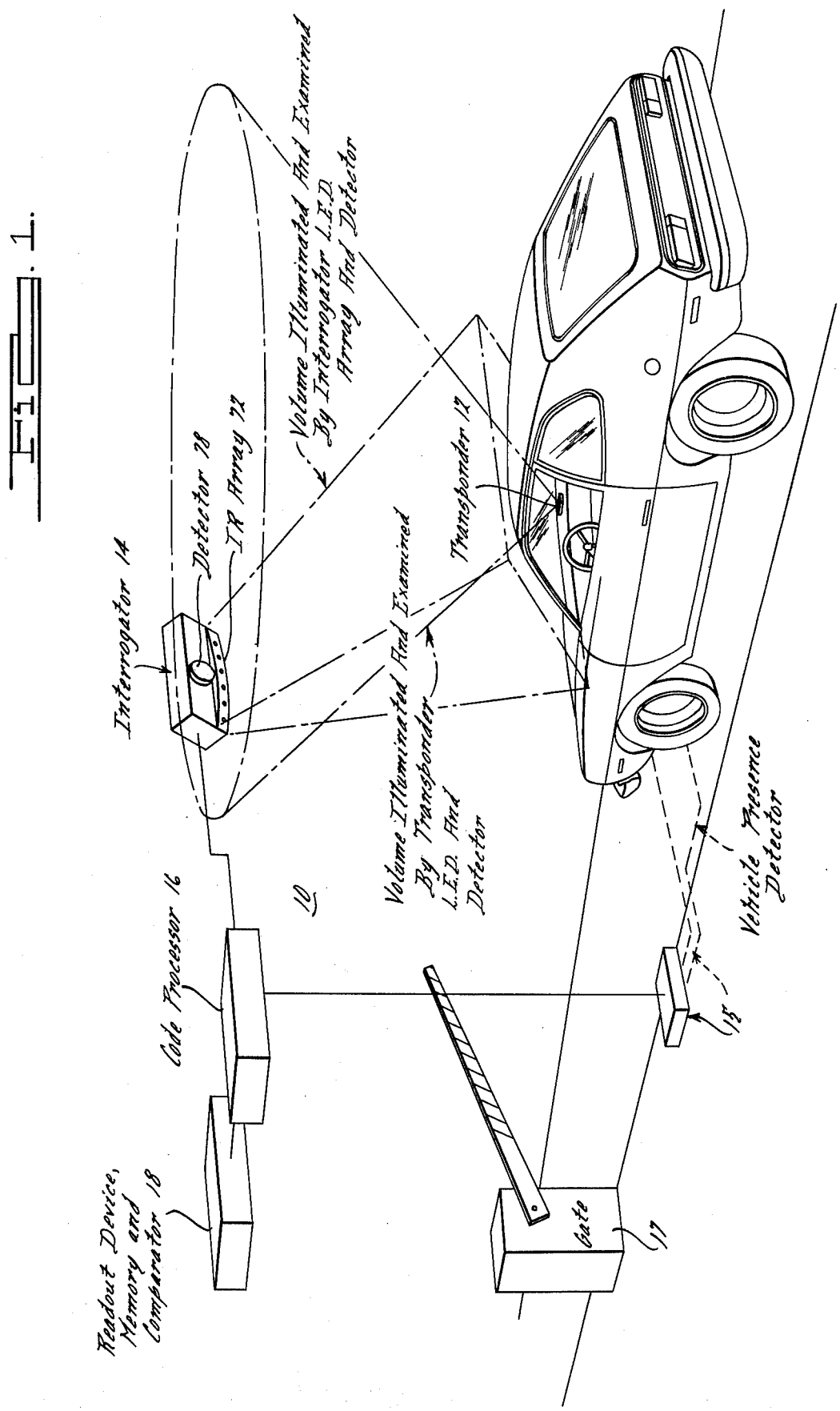
FIG. 1 is a view of an object identification system according to the present invention which in the exemplary application of FIG. 1 is used to identify vehicles as they enter and exit a parking facility.

In FIG. 1, the object identification system 10 of this invention is illustrated in an exemplary application for identifying vehicles entering a parking facility. The system 10 includes a transponder 12 which is preferably located on the dashboard of the vehicle and an interrogator 14 which is located in a fixed position above the entry lane of the parking facility. The transponder 12 and the interrogator 14 are in mutal optical communication. The system 10 further includes a code processor 16 and a readout device, memory and comparator 18 which are described in further detail hereinafter. The interrogator 14 may be operated on a continuous basis so as to detect and identify any transponder 12 within its field of view or may be activated using any conventional vehicle presence detector as illustrated at 15. Note that the interrogator 14 and the transponder 12 have overlapping fields of transmission/reception with the field of transmission/reception of the transponder being indicated by the interrupted lines showing a conical volume and the field of transmission/reception of the interrogator being indicated by the interrupted lines showing a trapezoidal volume. When the interrogator 14 communicates with an authorized transponder 12, the gate 17 to the parking facility is opened under the control of the code processor 16 and the memory comparator 18.

In FIGS. 2a and 2b, the relative positions of the transponder 12 relative to the interrogator 14 is illustrated in frontal and side views of the vehicle. In those figures, the overlapping nature of the fields of transmission/reception of the transponder 12 and interrogator 14 can be readily seen.

In FIG. 3, a block diagram of the object identification system 10 according to the present invention is illustrated. The system 10 is seen to comprise the transponder 12, the interrogator 14, the code processor 16, and the readout device, memory and comparator 18 which are shown in FIG. 1. The transponder 12 is normally in a receive only mode and is activated to a transmit mode upon the receipt of infrared light pulses, shown illustratively at 20. The transponder 12 is adapted to sequentially emit a coded set of pulses, for example, a repeated word comrprising 18 binary bits, along the light path shown illustratively at 22. The interrogator 14 continuously provides interrogating pulses shown illustratively at 20 and receives the transponder pulses 22 when a transponder 12 is within the field of interrogation of the interrogator 14. The interrogator provides a digital signal on line 24 to the code processor 16 which is representative of the code transmitted by the transponder 12. The code processor 16, in turn, provides a processed digital signal on light 28 to a readout device, memory and comparator 18 which is representative of the number stored in the transponder 12. The readout device, memory and comparator 18 provides a display or other indication of the number stored in the transponder 12, and compares that number with a compilation of authorized numbers stored in the memory.

Preferably, the interrogator is provided with a suitable optical or LED array dispersal system so that the light pulses transmitted by the interrogator will be confined to a predetermined area through which objects carrying the transponder 12 will pass. By employing a substantial number of LEDs, which by integral optics radiate most of their energy in a narrow conical beam less than 15° wide, the area illuminated by the array can be adjusted and a suitable intensity maintained at a selected distance from the interrogator. Preferably, the LEDs are disposed along a suitable curve to establish the appropriate dispersion which illuminates the selected area. In the example of FIG. 1, this area is the entry lane of a parking structure, just prior to the entry gate which is operable to admit the automobile into the parking structure. The interrogator optical systems should be further adapted to receive returning infrared pulses from this same area. Therefore, the highly directive nature of the optics of the interrogator and transponder can provide a convenient, and highly accurate, means of receiving responses of an interrogator located within a selected illuminated/detected volume and distinguishing that interrogator from other interrogators located elsewhere.

The interrogator 14 repeatedly emits infrared pulses at a constant frequency which are received by the transponder 12 within the interrogation volume. In response to those interrogator pulses, the transponder 12 emits pulses representative of its code. The code is binary form so that following receipt of each pulse along path 20, the transponder 12 will emit a pulse to represent a binary 1 or will not emit a pulse to represent a binary 0. The interrogator is adapted to be responsive to the receipt of a transponder pulse after the elapse of a predetermined time period subsequent to the emission of its own pulse so that it can distinguish between binary 1's and binary 0's. The pulsing process is repeated at a high repetition rate, e.g. 10KHz.

Although the code stored in the transponder 12 has a logic starting point and a logic ending point, the code transmitted to the interrogator 14 may be started at any point including points intermediate the logic starting point and the logic ending point. However, since the code is repeated a number of times during a single interrogation of the transponder 12 by the interrogator 14, and the code stored in the transponder 12 is selected so that the logic starting point can be identified, any random starting operation point can be accommodated.

In FIG. 4, a block diagram is illustrated of a transponder 12 according to the present invention. The transponder 12 is characterized by extremely low power consumption and commendably low manufacturing cost as will be appreciated by those skilled in this art in view of the following description thereof. More specifically, the transponder 12 may operate for more than 6 months on two standard 9-volt transistor radio batteries. The quiescent power consumption is less than 2 milliwatts with a quiescent current drain from the battery of less than 100 microamps.

The transponder 12 includes a detector 30 which may be a silicon P-N photodiode. Such detectors have a very wide dynamic range and a short circuit output current which is a linear function of the intensity of the received radiant energy.

The detector amplifier 32 provides its output to a filter, comparator and squaring circuit 34 which in turn provides square wave pulses representative of received interrogator pulses. The pulses from the filter, comparator and squaring circuit 34 are received by a first one-shot multivibrator 36 which provides the predetermined delay between the receipt of an interrogator pulse and the provision of a correlative transponder pulse. The first one-shot multivibrator 36 provides the output pulse of the multivibrator which is of fixed duration to two separate device inputs. This pulse is received by a programmable recirculating shift register 38, and is also received at one input of an AND gate 40. The recirculating shift register 38 provides pulses to the other input of the AND gate 40 in accordance with the binary code stored therein. More particularly, the recirculating shift register 38 is programmed such that it will yield a pulse when there is a logic 1 in the next position in the register and will not yield a pulse if there is a logic 0 in the next position in the register. Both the recirculating shift register 38 and the AND gate 40 are responsive to the trailing edge of the pulse from the one-shot multivibrator 36 so that the response of the recirculating shift register 38 and the AND gate 40 are delayed by the duration of the pulse from the one-shot multivibrator 36.

The logic conditions at the AND gate 40 are satisfied so that the AND gate 40 will provide a pulse to the second one-shot multivibrator 42 when a logic 1 is in the next position in the recirculating shift register 38 and the trailing edge of the pulse from the first one-shot multivibrator 36 arrives. The second one-shot multivibrator 42 provides a pulse of fixed duration to a LED driver amplifier 44 which in turn provides an amplified pulse to a light emitting diode (LED) 46. The LED 46 is in light communication with the interrogator 14 so that the interrogator 14 will receive the output pulse of the transponder 12 provided by the LED 46.

With reference now to FIG. 5, the general manner of operation of the recirculating shift register 38 will be explained. The binary code contained within the recirculating shift register 38 can be considered as having its bits arranged in the form of a circle as illustrated in FIG. 5. An arrow 48 indicates the random starting point for circulation of the pulses through the recirculating shift register 38. Note that the arrow is located at a shift register position having a binary 0. When an interrogator pulse is received by the transponder 12, the arrow is shifted to the next box in clockwise order as indicated by the arrow 50. If this next box contains a binary 1 as illustrated, the recirculating shift register 38 will provide an output to the AND gate 40 which in turn results in an output pulse from the transponder 12. Each time the recirculating shift register 38 is indexed to the next position, the transponder 12 will either provide an output pulse if the position has a binary 1 or no output pulse if the position has a binary 0. The initial position of the pulse in the shift register prior to the receipt of an interrogator pulse is not preset. The starting point, e.g. the position of the arrow 48, may be at any location in the shift register. As the transponder 12 receives pulses from the interrogator 14, the position of the pulses will shift around the circle. The structure of the binary number, however, will be formulated so that the beginning and end of the binary number can be determined by an appropriate logic circuit.

With reference to FIGS. 6a and 6b, the circuit of the transponder 12 will be considered in detail. With general regard to the integrated circuits used in the circuits described herein, pin numbers and power supply connections may not be identified in some instances where those connections are apparent to those skilled in the art, especially in the light of manufacturer recommendations. The detector amplifier 32 is seen to comprise a differential operational amplifier IC1 which may be a micro-power operational amplifier manufactured by Radio Corporation of America, Model Number CA 3094 T. The operational amplifier IC1 has two power supply voltages, +9 volts and −9 volts which are obtained through an appropriate connection of a pair of 9 volt transistor radio batteries. Note that the operation amplifier IC1 is connected at its inverting input pin 2 to one end of the detector 30 and at the non-inverting input pin 3 to the other end of the detector 30 (via ground). An emitter follower output is provided on pin 6. The detector amplifier 32 includes a feedback circuit including capacitor C1 and resistor R1 in accordance with standard practice with operational amplifiers. The capacitor C1, in conjunction with the capacitor C2, improves the stability and settling time of the operational amplifier 32. The capacitor C3 serves as a power supply filter while the resistor R2 establishes the quiescent current drain of the operational amplifier IC1.

The detector amplifier 32 operates as a linear current-to-voltage transducer so that the output signal to the filter, comparator and squaring circuit 34 is a voltage representative of the current through the detector 30 which in turn is representative of the intensity of the radiant energy impinging on the detector 30. The A.C. output voltage of the amplifier is then a constant times the product of the modulated intensity of the radiant energy received by the detector and the impedance of the feedback loop of the operational amplifier. This circuit inherently provides background radiation compensation as will be described. Note that the non-inverting pin 3 of the integrated circuit IC1 is connected to ground. Because of that ground connection, the negative feedback from the output of the integrated circuit IC1 through resistor R1 and capacitor C1 tends to drive the summing junction of operational amplifier IC1 to ground level under all signal conditions. When the detector 30 is operated in this condition, its output current and, hence, the output voltage of IC1 will be a linear function of radiation impinging upon the detector 30. As a result of this linear transfer function, the output voltage IC1 in response to received interrogator pulses will be algebraically additive to and otherwise unaffected by background radiation falling upon the detector 30. Since the repetition rate of interrogator pulses is rather high compared to the rate of change of anticipated backgrounds, the filter of circuit 34 will strongly tend to pass signals at the frequency of the received interrogator pulses and reject signals of lower frequencies from other sources.

The output of the detector amplifier on line 52 is provided to the filter, comparator and squaring circuit 34. The circuit 34 includes a filtering circuit comprising capacitors C4 and C5 and resistor R4 and R5 to yield a filtered signal on line 54 representative of the signal at the detector 30. The filter substantially rejects unwanted signals due either to the modulated artificial light sources at 120 Hz to background radiation in general, or to 1/$f$ noise. Preferably, the filter is a high-pass, two-pole filter, as shown, with the circuit parameters selected to provide poles located at approximately 500 Hz. A voltage divider comprising resistors R6 and R7 provides a reference potential on line 56 which is compared with the potential on line 54. Capacitor C6 acts as a filter for the reference potential on line 56.

The potentials on lines 54 and 56 are connected to the inverting and non-inverting outputs of a differential amplifier IC2, respectively. IC2 may be an operational amplifier produced by the Radio Corporation of America under the designation RCA CA 3094 T. As connected, the signal on line 54 from the detector 30 must exceed the reference signal on line 56, i.e. be more negative than the reference signal, before the output of integrated circuit IC2 goes negative. Note that the integrated circuit IC2 is in an open-loop configuration so that the integrated circuit IC2 essentially acts as a switch. In other regards, the integrated circuit IC2 is essentially connected as shown and described with respect to integrated circuit IC1.

By requiring the detector signal on line 54 to go more negative than the reference signal on line 56 before the provision of an output signal on line 58, interrogator light pulses are differentiated from system noise. In this regard, it is assumed that variations in the detector signal on line 54 which are of less magnitude than the magnitude of the reference signal on line 56 are system noise variations while variations in the detector signal on line 54 which are greater than the reference signal on line 56 represent interrogator light pulses.

The output of the integrated circuit IC2 is connected to a squaring circuit comprising transistors Q1 and Q1 and the associated biasing resistors. In the quiescent state, transistors Q1 and Q2 are biased into cutoff. When the output of integrated circuit IC2 switches to its low state, i.e., upon receipt of a light pulse of sufficient intensity to cause the signal on line 54 to become more negative than the reference signal on line 56, the transistor Q1 is driven into saturation which in turn drives Q2 into saturation. When transistor Q2 is driven into saturation, the output signal from the squaring circuit on line 58 goes negative.

With reference now to FIG. 6b, the squaring circuit output on line 58 is provided to the first one-shot multivibrator 36. The first one-shot multivibrator includes a differentiating circuit comprising capacitor C7 which converts each square wave from the squaring circuit on line 58 to a negative-going spike and a positive-going spike at the leading and trailing edges, respectively, of the square wave. These spikes are provided to one terminal of an integrated circuit IC3.

The first one-shot multivibrator 36 includes transistors Q3 and Q4 and a CMOS NAND gate integrated circuit IC3. Transistors Q3 and Q4 are normally off. CMOS logic is preferred since it has low power consumption and its output swings from the positive supply potential to the system ground potential to aid in turning transistors Q3 and Q4 on and off. Initially, input pin 1 of the NAND gate integrated circuit IC3 is biased at a logic 1 by resistor R14 which is connected to the +9 volt supply. Since Q3 and Q4 are off, input pin 2 of the NAND gate integrated circuit IC3 is also initially biased at logical 1 by resistor R15 which is connected to the +9 volt supply. Accordingly, the output of the NAND gate IC3 is low, i.e. at logical 0. When a detector signal is received from the squaring circuit on line 58, capacitor C7 provides the negative-going spike to input pin 1 of the NAND gate integrated circuit IC3 causing the output of the NAND gate integrated circuit IC3 to be raised to approximately +9 volts. Capacitor C8 is charged when the output of integrated circuit IC3 is high, i.e. at logical 1. When capacitor C8 is charged to a predetermined level by the output signal from the NAND gate integrated circuit IC3, transistor Q3 turns on and in turn turns on transistor Q4. Consequently, input pin 2 of the NAND gate integrated circuit IC3 is dropped to a logical 0. The output of the NAND gate integrated circuit IC3 remains high, even though the signal at input pin 1 rapidly returns to logical 1 as the spike from differentiating capacitor C1 dissipates, so long as Q3 and Q4 remain conducting under the control of the charge on capacitor C8 until the charge on capacitor C8 is reduced to a value which allows transistors Q3 and Q4 to again turn off. Transistor Q3 acts as a high input impedance buffer so that when it is on, and consequently, diode D1 is reverse-biased, the principal discharge path for capacitor C8 is through resistor R18. The voltage at the base of transistor Q3 decays exponentially from essentially +9 volts until it reaches approximately +1.4 volts, i.e. two-forward diode drops. At that time, the transistors Q3 and Q4 turn off. When transistor Q4 turns off, the signal on input pin 2 of NAND gate IC3 returns to logical 1 to cause the output of integrated circuit IC3 at pin 3 to return to logical 0.

In view of the above description of the first one-shot multivibrator 36, it can be seen that the duration of the pulse from the first one-shot multivibrator 36 is essentially determined by the values of capacitor C8 and resistor R18. In one exemplary embodiment capacitor C8 had a value of 0.001 microfarad and the resistor R18 had a value of 18 kilohms to provide a one-shot pulse duration of 30 microseconds.

The output signal from the first one-shot multivibrator 36 on line 60 is received by the recirculating shift register 38 which serves as a programmable memory for the transponder 12. More specifically, the recirculating shift register 38 stores the unique binary identification number of each respective transponder 12 in the object identification system. The recirculating shift register may be an integrated circuit IC4 of the type identified by the model number CD4006AE. Alternatively, a 64 bit recirculating shift register identified by the model number CD4031A may be used to increase the code size capability. Integrated circuits IC4 receives the pulses from the first one-shot multivibrator 36 at its input pin 3. Pin 3 is the usual clock input for the integrated circuit shift register IC4. The shift register is connected as illustrated to provide recirculation of the binary code stored therein. Upon each negative-going edge of the output pulse from the first one-shot multivibrator 36, the shift register IC4 is clocked through one position. Consequently, as the transponder 12 receives sequential pulses from the interrogator 14, which pulses yield output pulses from the first one-shot multivibrator 36, the binary code stored in the shift register IC4 is clocked through the positions in the shift register IC4 to cause the bit of the binary code stored in the shift register IC4 to appear sequentially at the shift register output pin 9.

The shift register is initially programmed, i.e., loaded with its unique binary code, by connecting the external data and external clock terminals of the shift register IC4, shown in FIG. 6b, to low impedance pulse sources which are external to the transponder 12. The low impedance pulse sources override any signals coming from the first one-shot multivibrator 36 or from the shift register output pin 9. THe correct sequence of binary bits are loaded into the shift register IC4 while externally clocking the shift register IC4 so as to load, for example, any desired 18-bit binary number. In the preferred embodiment, the 18-bit binary number has a 9-bit starting code and a 9-bit identifying code which will be explained. Upon disconnection of the external clock and external data terminals from the external pulse sources, the binary code remains stored in the shift register. It will be understood that binary codes having greater and lesser numbers of bits may be used depending upon the length of the code which is desired.

The shift register output on line 62 and the first one-shot multivibrator output pulses on line 60 are provided to the input terminals of an AND gate 40. In the preferred embodiment, the AND gate 40 comprises two NAND gates IC5 and IC6 which are connected as shown to perform the logical "AND" function. More specifically, if a signal appears at both input pins 5 and 6 of NAND gate IC5, the output signal on pin 4 of NAND gate IC5 will be a logic 0. This signal is provided to both inputs of NAND gate IC6 so that the output of NAND gate IC6 on pin 10 will be logical 1 when the output of NAND gate IC5 is a logical 0. Two NAND gates are used as connected instead of a single AND gate for reasons of economy since four NAND gates, designated herein as IC3, IC5, IC6 and IC7 (to be described), can be purchased economically in a single package.

The AND gate 40 provides an output signal on pin 10 during the simultaneous reception of the output signals from the shift register IC4 and the first one-shot multivibrator 36. Due to analog delay, the first one-shot multivibrator 36 provides its output signal approximately 3–15 microseconds after the beginning of an interrogator light pulse. The output pulses of the first one-shot multivibrator 36 have a fixed duration, e.g. approximately 30 microseconds. If there is a bit at the output position of the shift register IC4 when the output pulse from the first one-shot multivibrator 36 is provided, the AND gate 40 will be receiving two signals representing a logical 1 so as to provide an output signal in synchronism with the output pulse from the first one-shot multivibrator 36. On the other hand, if there is a logical 0 in the shift register output position upon the provision of an output pulse from the one-shot multivibrator 36, there will be no output signal from the AND gate 40. Consequently, the AND gate 40 can be looked upon as transferring output pulses from the first one-shot multivibrator at times when a logical 1 appears at the output pin 9 of the shift register IC4. Since the shift register IC4 is clocked by the trailing or negative-going edge of the pulse from the first one-shot multivibrator 36, a new bit is moved into the output position of the shift register IC4 immediately after the pulse transferred by the AND gate 40 is terminated so that the next data bit stored in the shift register IC4 is moved into position for transfer of a correlative pulse through the AND gate 40.

In view of the above explanation, it will be appreciated that a series of logical 1's and 0's corresponding to the binary number stored in the shift register IC4 is provided on the output line 64 of AND gate 40.

The output signal from the AND gate 40 is provided to the second one-shot multivibrator 42. The second one-shot multivibrator 42 has essentially the same construction as the first one-shot multivibrator 36. Therefore, the second one-shot multivibrator 42 is seen to include a differentiating capacitor C7' which provides positive and negative-going, sharped-peaked pulses or spikes, a timing capacitor C8' and a resistor R18' which together establish the duration of the output pulse of the second one-shot multivibrator 42, a NAND gate integrated circuit IC7, and transistors Q3' and Q4' which are operated in accordance with the charge across the timing capacitor C8'. In view of the detailed explanation of the operation of the first one-shot multivibrator 36, a detailed description of the second one-shot multivibrator 42 will not be provided. The second one-shot multivibrator 42 provides an output pulse of fixed duration on output line 68 which is initiated with the negative-going, trailing edge of the output pulse on line 64 from the AND gate 40. Since the output pulse from the second one-shot multivibrator 42 on line 66 is initiated upon the trailing edge of the output pulse from the AND gate 40 on line 64, the output pulse from the second one-shot multivibrator 42 on line 66 is delayed relative to the receipt of the the interrogator of the pulses, in addition to the analog delay between the receipt of the pulse by the transponder 12 and the initiation of the output pulse from the first one-shot multivibrator 36, a time period equal to the duration of the output pulse of the first one-shot multivibrator 36. This delay serves an important function as will be discussed in greater detail hereinafter.

A diode D2 extends from the output of the integrated circuit IC7 to pin 1 of the integrated circuit IC3 so as to clamp pin 1 of the integrated circuit IC 3 to +9 volts during the output pulse from the integrated circuit IC7. Since the LED 46 is driven in synchronism with the output pulse of the integrated circuit IC7, the clamping of pin 1 of the integrated circuit IC3 to +9 volts prevents any inadvertent firing of the integrated circit IC3 during the output pulse from LED 46. Accordingly, any reflection from the LED 46 to the detector 30 will not result in a spurious response of the transponder 12.

The output pulse on line 66 from the second one-shot multivibrator is received by the LED driver circuit 44. The LED driver circuit 44 essentially comprises a resistive voltage divider R21 and R22 and a Darlington amplifier integrated circuit 45. The Darlington amplifier 45 has sufficient current gain so that voltage divider will not be loaded to any significant degree when the LED is driven. The level of the LED current can be established by adjusting the values of resistors R21 and R22. A resistor R23 is connected in series with the LED 46 to provide an appropriate impedance for the output of the Darlington amplifier 45.

The integrated circuits used in the transponder 12 are preferably of the CMOS type which requires very low quiescent current levels so as to minimize the drain on the batteries. Note also that the transistors Q1–Q4, Q3' and Q4' are normally non-conducting to further minimize the drain on the batteries. As a result, a transponder of the circuit configuration shown having the components listed hereinafter is capable of operating for at least 6 months on two 9-volt transistor batteries.

The operation of the transponder 12 can be best appreciated in view of the signal charts in FIG. 5. In FIG. 5, a series of interrogator light pulses are seen to be received by transponder 12 at 100 microsecond intervals. The detector amplifier 32 provides correlative negative-going pulses on line 52 after a short analog delay. The filter, comparator and squaring circuit 34 provides inverted square wave pulses to the first one-shot multivibrator 36 on line 58. The first one-shot multivibrator 36 provides an output pulse on line 60 of fixed duration upon each trailing edge or negative-going portion of each pulse on line 58 from the filter, comparator and squaring circuit 34. Note that a pulse is provided on line 60 for each received interrogator light pulse. The recirculating shift register receives the pulses on line 60 but provides an output pulse which corresponds to an interrogator light pulse only when a logical 1 is at its output position. FIG. 7 indicates that the shift register output signal is at times at logical 1 and at times at logical 0, in accordance with the unique binary number which has been loaded into the recirculating shift register 38. Note that the output of the shift register remains at logical 1 when successive logical 1's appear at the output pin and that its output signal is initiated at the trailing ege of the output pulses from the first one-shot multivibrator 36. Accordingly, when two logical 1's appear at the output pin of the recirculating shift register 38 in succession, the output signal from the shift register 38 remains at the logical 1 level. The AND gate 40 provides output signals on line 64 which are in synchronism with the output signals from the first one-shot multivibrator 36 on line 60 and which are at logical 1 when the shift register is at logical 1 and are at logical 0 when the shift register output is at logical 0. Note that since the pulses from the second one-shot multivibrator 42 are initiated at the trailing edges of the pulses from the first one-shot multivibrator 36, a delay equal to the duration of the first one-shot multivibrator 36 is introduced at the second one-shot multivibrator 42. The output pulses from the second one-shot multivibrator 42 are amplified by the LED driver 44 so as to provide a current through LED 46 as illustrated. Note that the LED is energized or pulsed in accordance with the unique 18-bit binary number loaded in the recirculating register 38 so that a series of pulses representing logical 1's and 0's are emitted by the LED 46.

In FIG. 8, a block diagram is shown of the interrogator 14 and the code processor 16. The interrogator 14 is seen to comprise timing circuitry 68 which generally provides timing signals to the remainder of the circuitry and also includes a buffer circuit for providing buffered data and buffered flag signals. The timing circuitry 68 furthr provides timing pulses to an LED driver 70 which in turn provides amplified pulses to an array 72 of light emitting diodes (LED's). For example, the LED array may contain 40 LED's which are arranged in a dispersed pattern to cover the predetermined area through which transponders will traverse.

A signal processing circuit 74 receives timing signals from the timing circuitry 68 and provides unbuffered flag and data signals to the buffer circuit of the timing circuitry 68. The signal processing circuit also receives a signal representative of infrared pulses received by a detector 78 from a detector amplifier 76. The infrared detector 78 is disposed to receive infrared pulses emitted by the transponders 12 as they traverse the predetermined area of surveillance. The signal processing circuit 74 and the detector amplifier 76 receive amplifier blanking and detector blanking signals, respectively, from the timing circuitry 68 for purposes to be described.

Buffered data from the timing circuit 68 is transmitted to the code processor 16 through a pass/block circuit 80. The pass/block circuit is controlled by the buffered flag signal so as to pass buffered data for the duration of a buffered flag signal.

The code processor 16 includes a pair of serially connected 9-bit shift registers 82 and 84 which are synchronously stepped through the shift register positions under the control of a common clock signal. The shift register 84 is associated with a start code detector 86 which contains the necessary AND and NAND logic for determinng when a predetermined series of logical 1's and logical 0's appear in the 9-bit positions of the 9-bit shift register 84. The AND and NAND logic of the start code detector 86 uses well-known pattern recognition techniques, and consequently, will not be discussed in detail. Alternately, this logic may be accomplished using a small, commercially available digital computer. The series of logical 1's and logical 0's of the starting code is preselected to be uniquely identifiable as a starting code for the 18-bit word which is loaded in the transponder 12. In this regard, although different transponders will have different 9-bit identifying codes, each transponder to be identified by a given interrogator may have the same 9-bit starting code. The start code detector 86 provides a signal to a load/latch circuit 88 when the starting code is detected as properly positioned in the 9-bit shift register 84 to cause the transfer of the code in the 9-bit shift register 82 to the readout device 18. When the 9-bit starting code appears in the 9-bit shift register 84, it will be appreciated that the 9-bit shift register 82 will contain the 9-bit identifying code which indicates the unique number of the particular transponder 12 which is being interrogated.

The starting code should have more logical 1's than logical 0's so that the presence of a transponder 12 within the field of interrogation will be more readily made known to the interrogator 14. This will be more apparent in view of the discussion hereinafter of the use of a flag system. This requirement will be better appreciated if an extreme case is considered in which the transponder starting code as well as the identificaton code has all logical 0's. In that case, there will be no signal provided by the transponder 12 to the interrogator 14. Hence, the identification of the transponder 12 within the field of interrogation will not be made known to the interrogator 14.

Once a starting code is selected, identification codes must be selected which will not provide ambiguities when combined with the starting code. More particularly, the identification codes must be selected so that the starting code sequence of logical 1's and logical 0's must not again appear as the 18-binary code is recirculated within the recirculating shift register 38 until the starting code is again repeated. It is possible to select a few binary identification codes for a given starting code which will cause such an ambiguity. Appropriate identification codes can be determined manually simply by observing each possible sequence of logical 1's and logical 0's as the 18-bit binary code is recirculated to determine if the starting code is repeated at starting positions other than the first digit of the starting code. If the starting code is repeated only beginning at the first digit in the starting code, the selected identification code is appropriate. Alternatively, a computer program can be readily written to accomplish this task.

Figure 9:
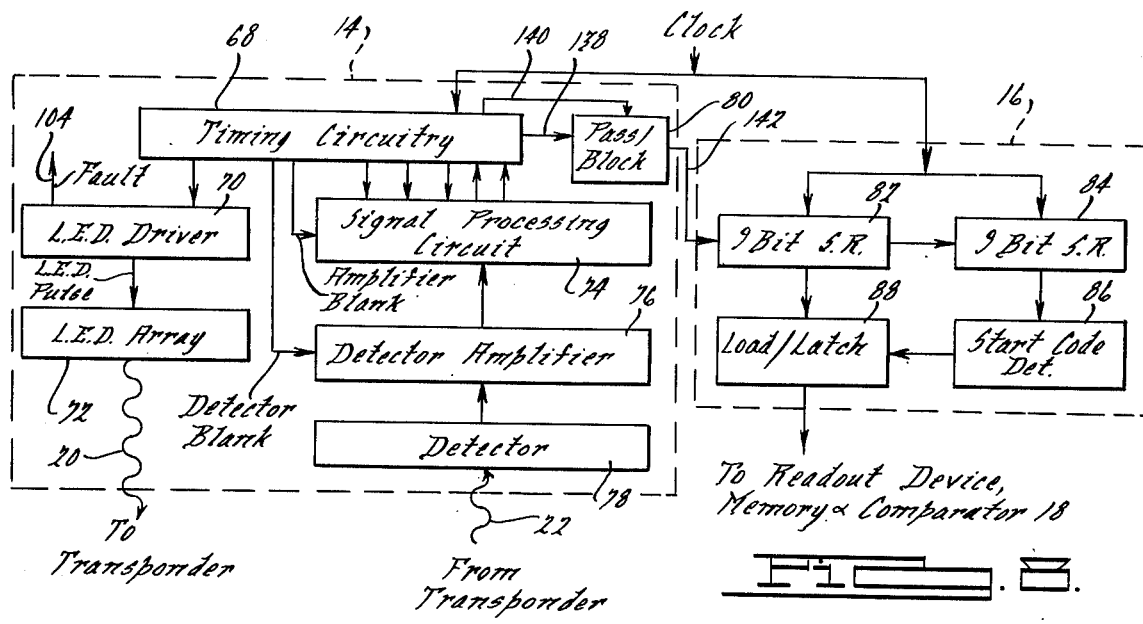
FIG. 9 is a circuit diagram of the timing circuitry of the interrogator of FIG. 8.

In FIG. 9, a circuit diagram is illustrated of the timing circuitry 68. The timing circuitry 68 is seen to comprise seven integrated circuits IC7'-IC13. Integrated circuits IC7'-IC12 are each connected to function as one-shot multivibrators. The duration of the output pulse from each one-shot multivibrator IC7'-IC12 is established by respective capacitors C9–C14 and variable potentiometers P1–P6. One-shot multivibrator IC7', IC8, IC9 and IC11 are triggered by a common clock signal from a conventional clock oscillator, specifically the same clock oscillator used to clock the 9-bit shift registers 82 and 84 so that the clocking of the timing circuit 68 is synchronous with the clocking of the 9-bit shift registers 82 and 84. One-shot multivibrator IC10 is triggered by the termination of the output pulse from the one-shot multivibrator IC9 while one-shot multivibrator IC12 is triggered by the termination of the output pulse from the one-shot multivibrator IC11. One-shot multivibrator IC11 provides the pulse to the LED driver 70 so as to establish the timing and duration of the infrared pulse from the interrogator LED array 72. One-shot multivibrator IC8 establishes the timing and duration of the blanking pulse received by the detector 78. One-shot multivibrator IC9 establishes the timing and duration of the amplifier blanking pulse received by the detector amplifier 76. One-shot multivibrator IC10 provides the background sample pulse and the flag blanking pulse to the signal processing circuit 74. One-shot multivibrator IC11 provides a fixed delay prior to the provision of the data sample pulse by the one-shot multivibrator IC12. Integrated circuit R13 is a buffer amplifier which receives unbuffered flag and unbuffered data signals and provides a buffered flag signal and a buffered data signal.

Figure 10:
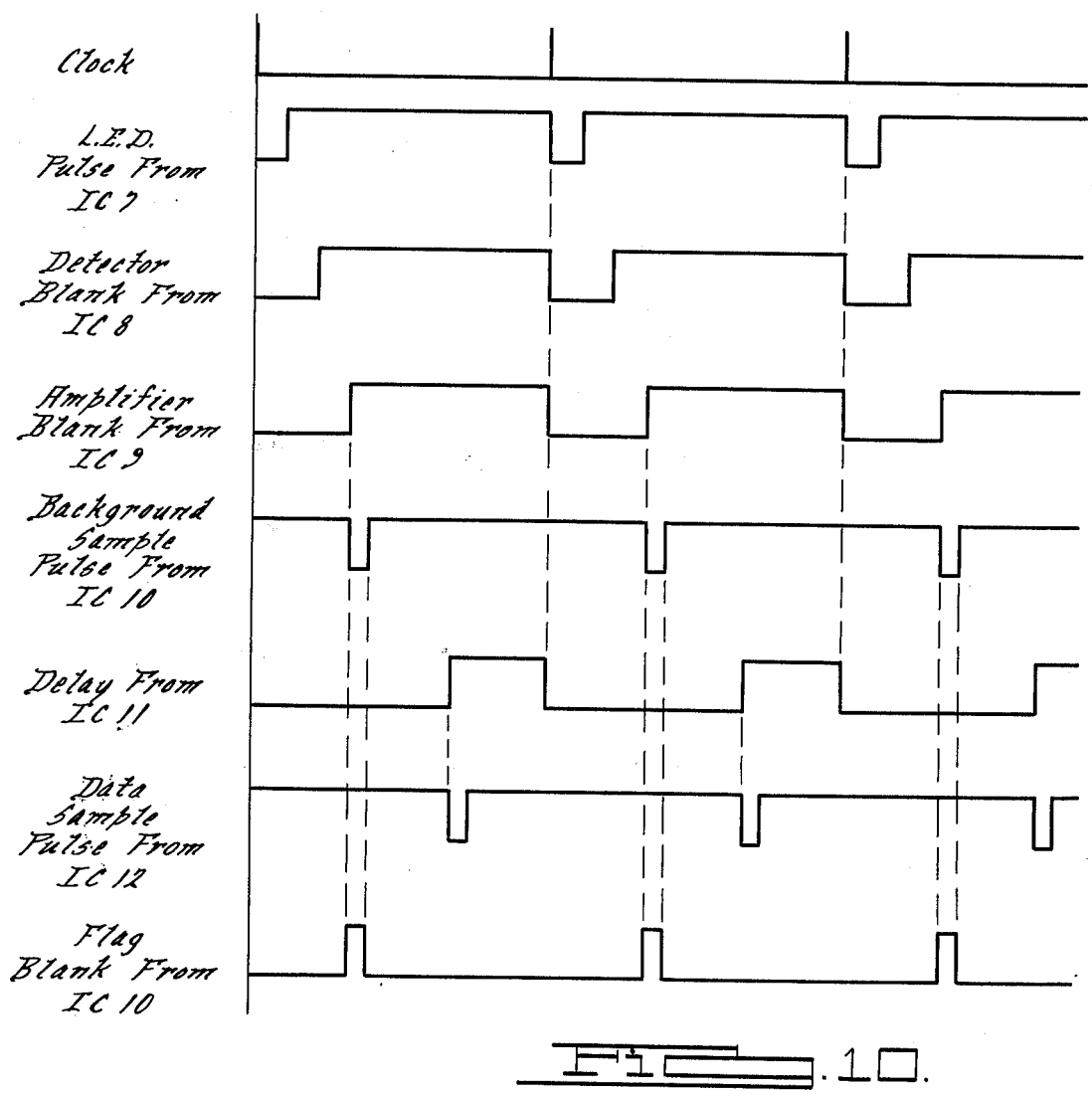
FIG. 10 is a chart of the signals generated by the timing circuitry of FIG. 9.

FIG. 10 is a signal diagram of the signals in the interrogator 14. The top line of FIG. 10 illustrates the constant frequency clock pulses. Note that the LED pulse from IC7', the detector blanking pulse from IC8, the amplifier blanking pulse from IC9 and the delay pulse from IC11 are all negative-going pulses which are initiated in synchronism with the clock pulse. Note also that the background sample pulse from IC10 and the flag blanking pulse from IC10 is initiated in synchronism with the termination of the amplifier blanking pulse. Also, note that the background sample pulse is a negative-going pulse while the flag blanking pulse is a positive-going pulse. FIG. 10 also illustrates that the data sample pulse from IC12 is initiated at the termination of the delay pulse from IC11. The purpose of the pulses illustrated in FIG. 8 will be described in conjunction with the following description of the circuit components of the interrogator 14.

With reference now to FIG. 11, the LED driver circuitry 70 will be described. The LED driver circuitry 70 consists of four driver circuits 90, 92, 94 and 96 and a fault detecting circuit 98. The driver circuits 90–96 are identical and therefore, only one will be described in detail.

Driver circuit 90 receives the LED pulse on input buss line 100 and provides an output signal across terminals 102. A first series array of LED's is connected across terminals 102 to be energized by the output signal at terminals 102. The LED pulse on line 100 is received at the base of a transistor Q5. Prior to the receipt of the pulse, the signal on line 100 is at a high potential so that transistor Q5 is fully on, i.e., saturated. When transistor Q5 is fully on, transistor Q9 is turned off so that Darlington amplifier pair IC14 is also off. Upon receipt of the negative-going LED pulse on line 100, transistor Q5 turns off thereby pulling up the base of transistor Q9, by virtue of its connection to the voltage divider comprising resistors R31 and R35 to turn on transistor Q9. When transistor Q9 turns on, the Darlington pair IC14 receives base current from the emitter of transistor Q9 to turn on the Darlington pair IC14. When the Darlington pair IC14 turns on, the LED string is connected between the positive supply potential of 50 volts and ground in series with resistor R51, Darlington pair IC14, and resistor R43. The LED string draws less than one amp of current. Accordingly, the base of transistor Q9 does not significantly load the voltage divider R31 and R35. Note that the voltage across resistor R43 is equal to the voltage established at the base of transistor Q9 by the voltage divider R31 and R35 minus three forward diode drops, i.e., 2.1 volts. By way of illustration, if the voltage at the base of transistor Q19 is 3.1 volts, the voltage across the resistor R43 will be one volt. If the resistance of resistor R43 is two ohms, the current through the resistor, and hence the current through the LED series string will be 0.5 amps. The Darlington pair IC14 appears to the LED string as a current source. Accordingly, by establishing the values of resistors R31, R35, and R43, the current through the LED string can be accurately controlled. As previously stated, driver circuits 92, 94, 96 are identical to circuit 90, and hence will not be described in detail.

The fault indicator circuit 98 provides an output signal whenever current stops flowing through any LED string at anytime that an LED pulse is provided on line 100. Prior to the receipt of the LED pulse on line 100, no current will be flowing through any of the LED strings. Accordingly, there will be no voltage across resistors R51–R54. Thus, transistors Q13–Q16 are non-conducting. Transistor Q17 of the fault indicator circuit 98 will therefore be fully on by virtue of the forward bias provided by diodes D2–D5 and resistor R59–R62. Transistor Q18 would also be forward biased except for the fact that its base voltage is held below its emitter voltage by the current path to ground through diode D6 and transistors Q8 of the driver circuit 96. Accordingly, transistor Q18 is nonconducting while transistor Q19 is conducting. Accordingly, the fault output signal at terminal 104 represents a logical 0.

When the negative-going LED pulse is present on line 100, a voltage drop exists across resistors R51–R54 by virtue of the current through the LED strings. This voltage drop will turn on transistors Q13–Q16, thereby reverse biasing diodes D2–D5, respectively, and turning transistor Q17 off. Since diode D6 is also reverse biased, transistor Q18 remains off, thereby leaving transistor Q19 on. Consequently, the fault output signal on line 104 remains at logical 0. Presuming now that a malfunction occurs to terminate the current through one of the LED strings, there will no longer be a voltage drop across the respective one of resistors R51–R54. Accordingly, the respective one of transistors Q13–Q16 will be non-conducting to allow the corresponding one of diodes D2–D5 to be forward biased. When any one of diodes D2–D5 are forward biased, transistor Q17 will become conductive by virtue of the current path through the corresponding one of diodes D2–D5 and the corresponding one of resistors R59–R62 to ground. Thus, diode D6 will be reverse biased thereby turning off transistor Q19. When transistor Q19 turns off, the output signal on line 104 will switch from logical 0 to logical 1 thereby indicating the malfunction. The fault signal on line 104 may be connected to appropriate light, buzzer, or other fault indicator.

The LED strings may each comprise 10 LED's so that the four strings comprise a total of 40 LED's. At a driving level of 0.5 amps for each LED, the total radiant output of the array will be 760 milliwatts for Type SSL-35 LED's. Alternatively, each string may comprise two Type TIXL-27 LED's driven at 2 amps. The total radiant output of the eight LED's of that array will be approximately 800 milliwatts. To provide for heat dissipation at each LED, each LED should have adequate heat-sinking using known heat-sinking structures. The array of LED's should be disposed to illuminate the predetermined area through which the transponders 12 will pass. For example, the LED's may be disposed in one or more rows which extend transversely of the path of the object to be identified. Preferably, the row(s) are curved to direct the energy in a dispersed illumination area or volume of the LED's.

In FIG. 12, a circuit diagram is shown of the interrogator detector and detector amplifier circuit. The photodetector 78 is preferably a silicon detector and is connected to a field-effect transistor Q20 which has a high input impedance, to provide optimum impedance matching to the silicon detector 78. A field-effect transistor used in the interrogator amplifier is not also used in the transponder amplifier due to its relatively high power requirements. The drain and source terminals of the field-effect transistor Q20 are connected in series with a resistor R75 which in turn is connected across the input terminals of an operational amplifier IC18. Accordingly, the conductivity of the field-effect transistor Q20 is controlled by the output current of the photodetector 78 which in turn is a linear function of the infrared radiation impinging upon the photodetector 78. The conductivity of the field-effect transistor Q20 determines the current flow through the resistor R75 to in turn effect the potential difference across the input terminals of the integrated circuit IC18.

The detector amplifier 76 further includes a blanking circuit 106 to immunize the detector amplifier 76 from the effects of reflected radiation during the interrogator LED pulses. It will be appreciated that the interrogator LED array emits a large amount of infrared power which is reflected back towards the interrogator detector 78 by objects within the co-extensive fields of view of the LED array and the detector 78. Since these reflected signals are generally many times the intensity of the infrared signals from the transponders, the reflected signals are strong enough to saturate the detector amplifier 76 of the interrogator thereby interfering with signals received from the transponder. This problem is obviated using a blanking process having two blanking steps, the first of which is accomplished by the blanking circuit 106.

The blanking circuit 106 has a field-effect transistor Q21 which is connected in parallel with the usual feedback resistor R73 of the operational amplifier IC18. The field-effect transistor Q21 is turned on by blanking pulses on line 108 from the timing circuitry 68 to shunt the feedback resistor R73, thereby reducing the transfer function to operational amplifier IC18 to nearly zero. Accordingly, when blanking pulses are received on line 108, the output voltage of operational amplifier IC18 is nearly zero, i.e., the operational amplifier IC18 is not saturated and does not transfer the signal at its input. Although saturation of the operational amplifier IC18 is prevented by the blanking pulses on line 108, the quiescent output voltage of the operational IC18 is still slightly higher than zero because of ambient light falling upon the detector 78. Accordingly, the blanking process introduces an ambient light pedestal into the real time output signal of the detector amplifier 76. This ambient light pedestal uses up a substantial part of the dynamic range of the signal processing circuit 74. To increase the usable dynamic range of the signal processing circuit 74, the ambient light pedestal is removed by a second blanking stage in the signal processor 74 to be described.

The field-effect transistor Q20 and the operational amplifier IC18 may be substituted with an operational amplifier having a field-effect transistor input such as that produced by Analogue Devices under the Model No. AD528. With such a device, the inverting input of the operational amplifier would be connected directly to the non-grounded side of the detector. As a result, the source terminal of the blanking field-effect transistor Q21 would be held more nearly to ground potential which is generally considered to be desirable.

Capacitor C16 and C17 are supply by-pass capacitors. Capacitor C18 is an AC coupling capacitor to a buffering amplifier IC19. The buffer amplifier IC19 provides a buffered signal on line 110 which has a level representing the infrared signal impinging on the detector 78 during the times that a blanking signal is not received on line 108. The buffer amplifier IC19 has the usual feedback path which includes resistor R77.

The detector amplifier output signal on line 110 is a real-time, capacitively-coupled signal. Accordingly, its absolute voltage level has no real defined meaning. The real-time signal which is desired is a signal having a voltage level which is indicative of the difference between the infrared energy falling upon the interrogator detector 78 during a transponder pulse and the infrared energy falling upon the interrogator device 78 in the absence of a transponder pulse. A real-time signal of that nature is obtained by shifting the incoming signal by a D-C voltage representative of the infrared energy falling upon the interrogator detector 78 when neither the interrogator nor transponder is transmitting so that the shifted signal will equal zero when there is no transponder or interrogator pulse. One such time period, i.e., when neither the interrogator nor transponder is transmitting, occurs at the trailing edge of the narrow pulse generated in the timing circuitry which has been identified as the background sample pulse.

With reference now to FIG. 13, the background sample pulse on line 112 from pin 1 of IC10 (shown in FIG. 9) is provided to the base of transistor Q22 through a coupling capacitor C19. Transistor Q22 is normally biased on by resistors R79, R78 and R81. The negative-going background sample pulse switches the transistor Q22 off to bring the collector of transistor Q22 from nearly −15 volts to nearly +15 volts. The collector of transistor Q22 is connected to the gate of a switching field-effect transistor Q25 through a diode D7. Diode D7 is normally forward-biased by the normally-on transistor Q22, and the gate of Q25 normally rests at nearly −15 volts, maintaining Q25 in the off-state. When transistor Q22 switches off, the gate of field-effect transistor Q25 is raised to the potential of the signal on line 110, turning Q25 on. Accordingly, during the period of the negative-going background sample pulse, the detector amplifier output signal on line 110 is provided to the capacitor C23 to bring the voltage of capacitor C23 up to the voltage level of the detector amplifier output signal on line 110. The capacitor has a small value of capacitance so that this may be accomplished. A unity-gain buffer amplifier IC19 which has a very high input impedance receives the charge voltage level on the capacitor C23 at its non-inverting input and provides a signal to the non-inverting input of a differential operational amplifier IC20 via a resistance voltage divider comprising nearly identical resistors R93 and R94. By virtue of the very high impedance of the buffer amplifier IC19, the signal level on capacitor C23 remains substantially at its initial charge level so that the output signal provided by buffer amplifier IC19 to the non-inverting input of differential operational amplifier IC20 continuously represents the detector amplifier output signal which existed during the brief background sample period. The detector amplifier output signal on line 110 is also provided to the operatonal amplifier IC20 through resistor R91 so that the background level signal at the non-inverting input of differential operational amplifier IC20 is continuously subtracted from the detector amplifier output signal at the inverting input from line 110 to provide a background-compensated, or background-clamped, detector amplifier signal on line 114 at the output of differential operational amplifier IC20. Note that resistors R91 and R92 must be of nearly equal resistance for the subtraction to be accurately accomplished.

In view of the preceding description, it will be appreciated that the circuit components Q25, C23 and IC19 comprise a sample-and-hold circuit for sampling and holding the detector amplifier output signal representative of the background level of infrared radiation at the detector 78, i.e., at a time when neither the transponder nor the interrogator are transmitting. It also will be appreciated that the background signal level is sampled on the occurrence of each background sample pulse so that the charge level on capacitor C23 is updated on each such pulse. Potentiometer P7 which is connected to buffer amplifier IC19 acts as an offset adjustment so that the output signal from differential amplifier IC20 may be set to equal zero when no interrogator or transponder pulse is present.

Operational amplifier IC21 inverts and amplifies the background compensated signal on line 114. Variable potentiometer P8 adjusts the gain of the differential operational amplifier IC21. The differential operational amplifier IC21 has an enable pin which receives the amplifier blanking signal on line 116 from integrated circuit IC9 of FIG. 9. When the amplifier blanking signal on line 116 is low, the output of differential operational amplifier IC21 on line 118 floats at nearly ground potential. When the amplifier blanking signal on line 116 is high, the operational amplifier IC21 operates as a conventional operational amplifier thereby providing an inverted and amplified background compensated detector signal on line 118. With reference to FIG. 10, note that the amplifier blanking signal is provided for the entire period of the detector blanking signal. Accordingly, since the output of operational amplifier IC21 is at ground potential when the amplifier blanking signal is low, the output signal of the operational amplifier IC21 is thusly held at ground potential during the detector blanking period. Accordingly, the ambient energy pedestal created by detector blanking which was previously described is effectively elimimated so that the interrogator circuitry retains its full dynanmic signal range.

The inverted and amplified background compensated signal on line 118 is provided to a second sample-and-hold circuit comprising a field effect transistor Q26, a signal holding capacitor C24, and a high input impedance operational amplifier IC22. This circuit is controlled by an inverting circuit comprising a transistor Q23 which is responsive to the negative-going data sample pulse on line 120 so as to sample the inverted and amplified compensated detector signal on line 118 during a portion of the transponder output pulse and retain that sampled value between data sample pulses. An output is provided on line 122, then, which is representative of the background compensated detector signal during the sampled period of the transponder output pulse. In this regard, the negative-going edge of the data sample pulse from IC12 is timed in accordance with the transponder pulse delay provided by the first one-shot multivibrator 36 so that it will occur during the period of the transponder output pulse.

The signal on line 122 representative of the background compensated detector amplifier output during the sampled period of the transponder pulse is connected to the non-inverting input of a flag comparator IC24 and the non-inverting input of a data comparator IC26. The flag comparator IC24 and the data comparator IC26 receive voltage reference signals at their inverting inputs on lines 124 and 126, respectively, from a voltage generating circuit 128. The reference generating circuit 128 includes an adjustable, filtered voltage divider having a resistor R101 and a potentiometer P9 with a filter capacitor C25. The output of the adjustable voltage divider 128 at the top of the potentiometer P9 is provided to the non-inverting input of a unity-gain buffer amplifier IC23. A second voltage divider comprising resistor R102 and resistor R103 receives the voltage on line 130 so as to provide two reference voltage levels. The first reference voltage level is provided on line 124 which is connected directly to buffer amplifier output line 130 while the second voltage level is provided on line 126 which is connected to the intermediate tap of the resistance voltage divider. Accordingly, it will be appreciated that the reference voltage on line 126 is determined by the voltage on line 124 and the values of resistor R102 and resistor R103, with the voltage on line 124 necessarily being greater than the voltage on line 126.

When the background compensated data on line 122 exceeds the upper threshold established by the voltage on line 124, then comparator amplifier IC24 provides an output signal on line 132 to a one-shot mulitvibrator comprising integrated circuits IC25. Note that the detector amplifier signal received at the non-inverting input of the comparator IC24 is filtered by a capacitor C26 so that the comparator IC24 will not respond to very brief signals of high amplitude. The one-shot mulitvibrator is programmed by capacitor C27 and resistor R99 to provide a relatively long flag output pulse on the line 134 whenever a signal is received on line 132. The flat output pulse on line 134 has a duration which is at least as long as the period of transmission of a plurality of transponder pulses and is preferably longer than the duration of the 18-bit word pulse sequence from the transponder 12.

The flag signal on line 134 is used to alert the code processor 16 to the fact that data which is deemed to be valid is being received by the interrogator. Data is deemed to be valid when a pulse is received during the transponder pulse sampling period which has an intensity sufficient to cause the background-compensated detector signal to exceed the flag threshold. The flag threshold on line 124 is set to be substantially higher than the data threshold on line 126, and preferably, approximately 50% higher than the data threshold on line 126. During the period of the flag pulse on line 134, data received by the interrogator 14 which exceeds the lower data threshold is processed by the code processor 16 even though that data does not exceed the higher flag threshold. If, during any time that the 18-bit binary number is being received from a transponder 12, a new pulse is received which exceeds the flag threshold on line 124, the one-shot multivibrator IC25 is retriggered so as to provide a continuous flag signal on line 134 to permit the continued receipt of data from the transponder 12.

Note that the one-shot multivibrator IC25 receives the flag blank at pin 4 which is an enable pin for the one-shot multivibrator IC25. This is to activate the flag system only during the brief flag blank pulse duration, which can be seen from FIG. 8 to be coextensive with the background sample pulse.

During the background sample pulse, noise spikes and switching transients are of a relatively low level. Accordingly, that time is selected as a desirable time to determine whether the detector signal on line 122 is above the flag threshold and to initiate the flag signal on line 134. Note, however, the detector signal is actually sampled during the data sample period which occurs prior to the flag blank pulse.

The data signals on line 122 are compared with the lower reference voltage on line 126 by the comparator IC26. The comparator IC26 provides output pulses on line 126 whenever the data pulses on line 122 exceed the threshold represented by the lower reference voltage. As previously described, the flag signals on line 134 and the data signals on line 136 are buffered by a buffer amplifier IC13 within the timing circuitry shown in FIG. 9.

With reference now to FIGS. 8 and 9, the buffered data signals are provided by buffer amplifier IC13 on line 138 to the pass/block circuit 80 while the buffered flag signals from buffer amplifier IC13 on line 140 are provided to the gating input of the pass/block circuit 80. The pass/block circuit 80 passes the buffer data signals on line 138 to the shift registers 82 and 84 whenever a buffered flag signal exists on line 140.

In the exemplary object identification system according to the present invention, components having the following values were used:

Resistors

| | | | | | |
|---|---|---|---|---|---|
| R1 | 330 K | R27 – R30 | 470 | R77 | 75 K |
| R2 | 2.7 M | R31 – R34 | 4 K | R78 | 27 K |
| R3 | 330 K | R35 – R38 | 470 | R79 | 10 K |
| R4 | 47 K | R39 – R42 | 1 K | R80 | 1 K |
| R5 | 470 K | R43 – R46 | 2, 10 Watt | R81 | 10 K |
| R6 | 22 K | R47 – R50 | 100 | R82 | 27 K |
| R7 | 2.2 M | R51 – R54 | 2, 10 Watt | R83 | 10 K |
| R8 | 2.7 M | R55 – R58 | 100 | R84 | 1 K |
| R9 | 3.3 K | R59 – R62 | 7.5 K | R85 | 10 K |
| R10 | 1 K | R63 | 10 K | R86 | 68 K |
| R11 | 470 | R64 | 820 | R87 | 10 K |
| R12 | 1 K | R65 | 43 K | R88 | 1 K |
| R13 | 2.7 K | R66 | 5 K | R89 | 10 K |
| R14 | 5.6 K | R67 | 680 | R90 | 4.7 K |
| R15 | 5.6 K | R68 | 510 | R91–R94 | 10 K, 1% |
| R16 | 2.2 K | R69 | 5 K | R95 | 1.8 K |
| R17 | 10 K | R70 | 3 K | R96 | 4.7 K |
| R18 | 18 K | R71 | 100 | R97 | 1.8 K |
| R19 | 4.7 K | R72 | 5 K | R98 | 2.7 K |
| R20 | 4.7 K | R73 | 240 K | R99 | 10 K |
| R21 | 4.3 K | R74 | 1.5 K | R100 | 2.7 K |
| R22 | 5.6 K | R75 | 4.7 K | R101, R102 | 4.7 K |
| R23 | 10 | R76 | 100 K | R103 | 10 K |
| | | | | R104 | 2.7 K |

Capacitors

| | | | |
|---|---|---|---|
| C1, C2 | 10 pfd | C15 | .047 ufd |
| C3 | 47 fd at 15 v | C16, C17 | 47 ufd |
| C4 | .0047 ufd | C18 | 0.5 |
| C5 | 680 pfd | C19–C21 | 10 fd at 25 v |
| C6 | 10 ufd at 25 v | C22 | 47 fd at 20 v |
| C7, C8 | .001 ufd | C23, C24 | .001 ufd |
| C9 – C11, C13 | .01 uf | C25 | 10 ufd at 20 v |
| C12, C14 | .0022 ufd | C26 | .001 ufd, mylar |
| | | C27 | .47 ufd, mylar |

Transistors

| | | | |
|---|---|---|---|
| Q1 | 2N5087 | Q13 – Q17 | 2N5087 |
| Q2 | 1/5 of RCA CA3086 (IC5) | Q18 | 2N5210 |
| Q3, Q3' | 1/5 of CA3086 (IC5) | Q19 | 2N2270 |
| Q4, Q4' | 1/5 of CA 3086 (IC5) | Q20 | 2N4868 |
| Q5 – Q8 | 2N5210 | Q21 | 2N5640 |
| Q9 – Q12 | 2N2270 | Q22, Q23 | 2N5210 |
| | | Q25, Q26 | 2N5640 |

Integrated Circuits

| | | | |
|---|---|---|---|
| IC1, IC2 | CA3094T | IC14 – IC17 | Mj1000 |
| IC3, IC5 – IC7 | ¼ of CD4011AE | IC18 | CA3100S |
| IC4 | CD4006AE | IC19, IC20, IC22 | N5556V |
| IC7', IC8 – IC12 | SN74121 | IC21 | HA2506 |
| IC13 | SN7405 | IC23 | N5741V |
| Darlington Amp 45 | D40C1 | IC24, IC26 | LM311N |
| | | IC25 | SN74122 |

Resistors-continued

| Diodes | | Potentiometers | |
|---|---|---|---|
| D1 – D6 | IN3064 | P1 – P6 | 10 K, 15 Turn |
| | | P7, P9 | 10 K, 15 Turn |
| | | P8 | 50 K, 15 Turn |
| LED | | Detectors | |
| Transponder LED SSL55CF | | Transponder P10-PV-TO5, Silicon | |
| Interrogator 40-SSL35 or 8-TIXL-27 | | Interrogator ½ × 3 CM, Silicon | |

The manner in which the starting code is detected, and the 9-bit identifying number is retrieved and compared with a compilation of authorized numbers in a memory, has been previously described and will not be repeated here. It should be noted, however, that the digital processing functions whereby the starting code is detected, and the 9-bit identifying number is retrieved and compared with a compilation of authorized numbers in a memory can be readily accomplished on a small digital computer using an appropriate computer program. The system using a digital computer can also be adapted to perform accounting functions such as determining the number of times a vehicle has used the parking facility during a given calendar period, the length of time the vehicle has used the parking facility during a given calendar period, and whether a particular vehicle is in or out of the parking facility. Moreover, a computer program may require that a vehicle carrying a particular transponder leave prior to allowing the re-entry of a vehicle having that particular transponder. Such a requirement will thwart attempts to gain unauthorized entry of vehicles into the parking facility by "passing back" the transponder.

It is to be understood that the foregoing description is that of preferred embodiments of the invention. Various changes and modifications may be made without departing from the spirit and scope of the invention as defined by the appended claims.

What is claimed is:

1. For an identification system including a transponder to be identified and an interrogator for determining the identification of the transponder, the improvement wherein the transponder comprises:
    receiving means adapted to receive repetitive spaced pulses communicated to the transponder by said interrogator including means for converting said received pulses into correlative clock pulses;
    storage means for storing an identifying code for said transponder, said storage means receiving said clock pulses and being adapted to provide said stored identifying code in response to receipt of said clock pulses; and
    delay means and transmitting means for causing pulses representative of said identifying code from said storage means to be transmitted to said interrogator with individual ones of said transmitted pulses being correlative to respective individual ones of said received pulses and being transmitted in predetermined timed relationship with said respective individual ones of said received pulses so that said transmitted pulses are transmitted during the space between said received pulses whereby said received pulses can be temporally distinguished from said transmitted pulses and said transponder can be identified by said interrogator.

2. An identification system according to claim 1 wherein said storage means is adapted to store an identifying code which is in the form of a series of binary bits and wherein said storage means is further adapted to provide each bit of said series of binary bits in sequence in response to the receipt of said clock pulses.

3. An identification system according to claim 2 wherein said storage means provides one of said series of binary bits for each one of said clock pulses received by said storage means.

4. An identification system according to claim 1 wherein said storage means is adapted to store a plurality of bits and wherein said storage means is further adapted to provide one of said plurality of bits upon receipt of each of said clock pulses.

5. An identification system according to claim 4 wherein said receiving means is adapted to provide a clock pulse upon receipt of each of said interrogator pulses so that said storage means provides one of said bits in accordance with the receipt of each of said interrogator pulses.

6. An identification system according to claim 1 wherein said transmitting means is adapted to transmit pulses of fixed duration representing said identifying code.

7. An identification system according to claim 1 wherein said receiving means is adapted to provide a clock pulse for each received interrogator pulse, said storage means is adapted to store a series of bits representative of logical "one's" and logical "zero's", one of said bits being provided upon receipt of each of said clock pulses, and said transponder is adapted to provide a pulse of fixed duration for each bit representative of logical "one".

8. An identification system according to claim 7 wherein said transponder is adapted to not provide a pulse for each bit representative of a logical "zero".

9. An identification system according to claim 1 wherein said interrogator pulses are emitted at a predetermined frequency and wherein said transponder pulses are emitted at said predetermined frequency.

10. A vehicle identification system comprising:
    interrogator means including a portion adapted to transmit infrared pulses through the windshield of vehicles and to receive infrared pulses transmitted through the windshield of said vehicle, said portion being positioned in front of said windshield of said vehicles to receive infrared pulses transmitted through the windshield by said transponder means and to transmit infrared pulses through said windshield to said transponder means, said portion further including means restricting the field of transmission of said infrared pulses and the field of receipt of said infrared pulses so that only one vehicle may be located with its windshield within said fields of transmission and receipt; and
    transponder means located within said vehicle so as to receive infrared pulses from said interrogated which are transmitted through said windshield and to transmit infrared pulses through said windshield to said interrogator, said transponder being adapted to provide an identifying number by means of the transmission of said infrared pulses to said interrogator.

11. For an identification system including a transponder to be identified and an interrogator for determining the identification of said transponder, the improvement wherein the transponder comprises;

receiving means adapted to receive pulses communicated to the transponder by said interrogator;

a recirculating shift register having an identifying code comprised of a plurality of bits stored therein, said shift register being responsive to received interrogator pulses for recirculating said bits within said shift register so as to maintain the storage of said bits of said identifying code in said shift register while also sequentially providing the bits of said identifying code to an output terminal thereof; and transmitting means for receiving said sequential bits of said identifying code from said output terminal of said recirculating shift register and for transmitting pulses to said interrogator in accordance with said bits of said identifying code whereby said transponder can be identified by said interrogator.

12. An identification system according to claim 11 wherein said shift register provides one bit for each received interrogator pulse.

13. An identification system according to claim 11 wherein said bits of said identification code have a logical beginning and a logical end and wherein said bits are positioned in said recirculating shift register without regard to said logical beginning and logical end.

14. An identification system according to claim 11 wherein said recirculating shift register has a plurality of bit positions with each bit of said identifying code being located at respective ones of said bit positions and said recirculating shift register is adapted to shift said bits from position to position in response to said received interrogator pulses.

15. An identification system according to claim 11 wherein said shift register is adapted to store bits representative of logical "one's" and logical "zero's", and wherein said transponder is adapted to provide a pulse of fixed duration for each bit representative of a logical "one".

16. An identification system according to claim 15 wherein said transponder is adapted to not provide a pulse for each bit representative of a logical "zero".

17. For an identification system including a transponder emitting relatively low power infrared pulses to be identified and an interrogator emitting relatively high power infrared pulses for determining the identification of said transponder, the improvement wherein the interrogator comprises:

transmitting means adapted to transmit said relatively high power infrared pulses during predetermined spaced periods to the transponder;

receiving means adapted to receive correlative relatively low power infrared pulses communicated to the interrogator by said transponder and having sufficient sensitivity to respond to said relatively low power infrared transponder pulses and thereby being deleteriously affected by receipt of relatively high power infrared pulses, with each transponder infrared pulse being delayed relative to correlative ones of said interrogator infrared pulses so that said correlative transponder infrared pulses are received during periods intermediate said spaced periods; and means for rendering said receiving means of said interrogator at least substantially non-responsive to received infrared pulses during the periods of transmission of said interrogator infrared pulses so that said receiving means is not deleteriously affected by reflections of said relatively high power interrogator infrared pulses.

18. An identification system according to claim 17 wherein each transponder pulse is delayed relative to a correlative one of said interrogator pulses by a predetermined period.

19. An identification system according to claim 18 wherein said predetermined period is a period of time.

20. An identification system according to claim 17 wherein said receiving means includes amplifying means for amplifying a signal representative of received transponder pulses and said means for rendering said receiving means substantially non-responsive to received pulses during the transmission of said interrogator pulses reduces the gain of said amplifying means during the transmission of said interrogator pulses.

21. An object identification system comprising:

interrogator means including transmitting means adapted to transmit relatively high power infrared pulses during predetermined spaced periods and receiving means adapted to receive correlative relatively lower power infrared pulses communicated to the interrogator and being sufficiently sensitive to respond to said relatively low power infrared transponder pulses and thereby being deleteriously effected by receipt of relatively high power infrared pulses, said receiving means including means rendering said receiving means substantially non-responsive to received infrared pulses during the periods of transmission of said interrogator infrared pulses by said transmitting means and responsive to pulses received a predetermined period of delay after the transmission of each of said interrogator pulses; and transponder means adapted to receive infrared pulses from said interrogator and to transmit correlative relatively low power infrared pulses to said interrogator, said transponder being adapted to delay the transmission of a correlative infrared pulse to said interrogator for said predetermined period of delay, said predetermined period of delay being established so that said transponder infrared pulses are transmitted intermediate the transmission periods of said interrogator infrared pulses.

22. An identification system according to claim 21 wherein said predetermined period is a period of time.

23. An identification system according to claim 21 wherein said receiving means includes amplifying means for amplifying a signal representative of received transponder pulses and said means for rendering said receiving means substantially non-responsive to received pulses during the transmission of said interrogator pulses reduces the gain of said amplifying means during the transmission of said interrogator pulses.

24. An object identification system comprising;

interrogator means adapted to transmit pulses and to receive pulses;

transponder means adapted to receive pulses from said interrogator and to transmit pulses to said interrogator, said transponder being further adapted to provide a code by means of said transmitted pulses to said interrogator; and identifying means associated with said interrogator means being responsive to a selected characteristic of received pulses which is presumed to clearly indicate an actual receipt of a transmission from said transponder means and for generating a flag signal representative thereof for a predetermined period; and processing means for processing said pulses received from said transponder means during the predetermined period of generation of said flag signal including pulses not having said selected characteristic and therefore, in the absence of said flag signal, would not be presumed to clearly indicate an acutual receipt of a transmission from said transponder means and thus would not have been processed in the absence of said flag signal.

25. An object identification system according to claim 24 wherein said identifying means provides said flag signal for a time period during which a plurality of said pulses are received by said interrogator means.

26. An object identification system according to claim 24 wherein said pulses represent bits of a code having a predetermined number of said bits and wherein said flag signal is provided for at least the period of generation of said code.

27. An object identification system according to claim 24 wherein said flag signal is provided for a predetermined period of time.

28. An object identification system according to claim 24 wherein said identifying means is resposive to a pulse having a magnitude greater than a predetermined magnitude.

29. An object identification system according to claim 28 wherein said processing means processes pulses received from said transponder means which are greater than a second lesser predetermined magnitude during the provision of said flag signal by said identifying means.

30. For an identification system including a transponder to be identified and an interrogator for determining the identification of the transponder, the improvement wherein the transponder comprises:

receiving means adapted to receive repetitive spaced pulses communicated to the transponder by said interrogator including means for converting said received pulses into first electrical pulses;

storage means for storing an identifying number for said transponder, and storage means receivng said first electrical pulses and providing an electrical signal representative of said stored identifying number in response to said received first electrical pulses;

transmitting means for receiving said first electrical pulses and said electrical signal and for transmitting second pulses representative of said identifying code to said interrogator when said first electrical pulses and said electrical signal are simultaneously received by said transmitting means whereby said transponder transmits said identifying number to said interrogator; and delay means for delaying the time at which at least one of said first electrical pulses and said electrical signal are received by said transmitting means relative to the receipt of said received pulses so that respective ones of said second pulses are transmitted during the space between respective ones of said received pulses.

31. An identification system according to claim 30 wherein said storage means is adaptcd to store an identifying code which is in the form of a series of binary bits and wherein said storage means is further adapted to provide each bit of said series of binary bits in sequence in response to the receipt of said first electrical pulses.

32. An identification system according to claim 30 wherein said storage means provides one of said series of binary bits for each one of said first electrical pulses received by said storage means.

33. An identification system according to claim 30 wherein said storage means is adapted to store a series of bits representative of logical "ones's" and logical "zero's", one of said bits being provided upon receipt of each of said first electrical pulses, said transmitting means being adapted to provide a pulse for each bit representative of logical "one".

34. An identification system according to claim 33 wherein said transmitting means is adapted to not provide a pulse for each bit representative of a logical "zero".

35. An identification system according to claim 30 wherein said interrogator pulses are emitted at a predetermined frequency so that said transmitting means pulses are emitted at said predetermined frequency.

36. An identification system according to claim 30 wherein said delay means delays said transmitting means pulse relative to a correlative one of said pulses communicated to the transponder by said interrogator by a predetermined period.

37. An identification system according to claim 36 wherein said predetermined period is a period of time.

38. An identification system according to claim 30 wherein said delay means delays said first electrical pulses.

39. An identification system according to claim 30 wherein said delay means delays said electrical signal.

40. An identification system according to claim 30 wherein said delay means delays said first electrical pulses and said electrical signal.

41. An identification system according to claim 30 wherein said transmitting means includes "AND" means receiving said first electrical pulses and said electrical signal and provides an output pulse resulting in one of said third electrical pulses upon simultaneous receipt of said first electrical pulses and said electrical signal.

42. An automobile identifying system utilizing a transponder carried by the vehicle comprising:

first means responsive to the presence of said automobile for providing a first signal representative thereof independently of said transponder;

second means independent of said first means and cooperative with said transponder responsive to the presence of said transponder for providing a second signal representative thereof, said second means including interrogator means adapted to transmit pulses and to receive pulses, said transponder being adapted to receive pulses from said interrogator and to transmit pulses to said interrogator representative of an identifying code whereby said transponder can be identified by said interrogator means; and means responsive to both said first and second signals for identifying said transponder and determining the presence of said automobile whereby two independent determinations are made and whereby a single one of said determinations indicates either the presence of an automobile without a transponder or the presence of a transponder without an automobile.

43. An automobile identifying system according to claim 42 wherein certain of said identifying codes represent an authorized code and said means responsive to both said first and second signals authorizes passage of said object upon receipt of both said authorized code and said first signal representative of the presence of said object, and does not authorize passage of said object upon the receipt of only one of said authorized code and said first signal representative of the presence of said object.

44. For an identifying system including a transponder to be identified and an interrogator for determining the identification of the transponder, the improvement wherein the transponder comprises:

receiving means having a sensitivity to detect received pulses which are separated by a predetermined time period and are of varying intensity over a predetermined range of intensities from said interrogator and to provide correlative electrical pulses having a characteristic representative of the intensity of said received pulses with said predetermined range of intensities;

means responsive to said electrical pulses for transferring an electrical pulse when said characteristic of said electrical pulse indicates that the intensity of said electrical pulse exceeds a predetermined intensity within said range of intensities and for blocking said electrical pulse when said characteristic of said pulse indicates that the intensity of said pulse does not exceed said predetermined intensity within said range of intensities; and delay and transmitting means for receiving said transferred electrical pulses for transmitting pulses of a predetermined intensity to said interrogator correlative to certain ones of said electrical pulses of which said characteristic indicates said pulses exceed said predetermined intensity regardless of the degree by which said certain electrical pulse exceeds said predetermined intensity, but delayed relative to said electrical pulses so that individual ones of said transmitted pulses are transmitted in the time period between individual ones of said received pulses whereby said transponder can be identified by said interrogator.

45. An identifying system according to claim 44 wherein said means responsive to said electrical pulses includes threshold means having a predetermined voltage threshold for transferring each of said electrical pulses having a voltage level exceeding said voltage threshold and for blocking each of said electrical pulses which does not exceed said voltage threshold.

46. An identifying system according to claim 44 wherein said certain ones of said electrical pulses represent an identifying code for said transponder.

47. An identifying system according to claim 46 wherein said identifying code comprises a series of logical "ones's" and logical "zero's" and wherein said certain ones of said electrical pulses represent logical "one's".

48. An identifying system according to claim 44 wherein said means responsive to said electrical pulses includes storage means for storing an identifying code and wherein said certain electrical pulses are representative of said stored identifying code.

49. An identifying system according to claim 48 wherein said means responsive to said electrical pulses includes storage means having a plurality of storage positions for storing said identifying code in a predetermined sequence in said storage positions.

50. For an identification system including a transponder to be identified and an interrogator for determining the identification of said transponder, the improvement wherein the transponder comprises:

transmitting means adapted to transmit pulses to the interrogator in response to correlative electrical pulses;

receiving means adapted to receive pulses communicated to the transponder by said interrogator for providing said electrical pulses to said transmitting means;

means for rendering said transponder at least substantially non-responsive to received pulses during the transmission of said transponder pulses, said means being responsive to said electrical pulses for inhibiting the generation of a further electrical pulse due to the reflection of said transmitting means pulse to said receiving means.

51. An identification system according to claim 50 wherein said transponder includes circuit means receiving input electrical pulses from said receiving means correlative to pulses communicating to the transponder by said interrogator and provides output electrical pulses correlative to said input electrical pulses and feedback means for feeding back at least a portion of said output electrical pulses to counteract said input electrical pulses so that any input electrical pulses due to the reflection of a pulse from said transmitting means of said transponder to said receiving means of said transponder are rendered ineffective.

52. An identification system according to claim 51 wherein said circuit means includes an input terminal receiving said input electrical pulses and an output terminal providing said output electrical pulses and wherein said feedback means includes diode means connected between said output terminal and said input terminal of said circuit means.

53. In a parking facility, a system for controlling utilization thereof by automobiles carrying a transponder comprising:

an entry permitting means including first means responsive to the presence of said transponder proximate said entry permitting means for providing a first signal representative thereof, said first means including interrogator means adapted to transmit pulses and to receive pulses, said transponder being adapted to receive pulses from said interrogator and to transmit pulses to said interrogator representative of an identifying code whereby said transponder can be identified by said interrogator means, means responsive to said first signal for identifying said transponder so that the allowability of an automobile carrying said transponder can be determined and for providing an entry enabling signal, and means for controlling said entry permitting means to allow entry of an automobile in response to said entry enabling signal; and an exit means including second means responsive to the presence of said automobile proximate said exit means for providing a second signal representative thereof independently of said transponder, third means independent of said second means and cooperative with said transponder and responsive to the presence of said transponder proximate said exit means for providing a third signal representative thereof, said third means including interrogator means adapted to transmit pulses and to receive pulses, said transponder being adapted to receive pulses from said interrogator and to transmit pulses to said interrogator representative of an identifying code whereby said transponder can be identified by said interrogator means, and means responsive to both said second and third signals for identifying said transponder and determining the presence of said automobile proximate said exit means whereby two independent determinations are made, so that entry of an automobile may be allowed least at times only in response to the prior occurrence of both said second and third signals indicating prior exit of an automobile and a transponder whereby passing back of said transponder from automobile to automobile at said entry permitting is ineffective to permit entry of more than the first such automobile.

54. An identifying system according to claim 44 wherein said characteristic is the amplitude of said pulses.

55. In a parking facility, a system for controlling utilization thereof by automobiles carrying a transponder comprising:

an entry permitting means including first means responsive to the presence of said transponder proximate said entry permitting means for providing a first signal representative thereof, said first means including interrogator means adapted to transmit pulses and to receive pulses, said transponder being adapted to receive pulses from said interrogator and to transmit pulses to said interrogator representative of an identifying code whereby said transponder can be identified by said interrogator means, means responsive to said first signal for identifying said transponder so that the allowability of an automobile carrying said transponder can be determined and for providing an entry enabling signal, and means for controlling said entry permitting means to allow entry of an automobile in response to said entry enabling signal; and an exit means including second means cooperative with said transponder and responsive to the presence of said transponder proximate said exit means for providing a second signal representative thereof, said second means including interrogator means adapted to transmit pulses and to receive pulses, said transponder being adapted to receive pulses from said interrogator and to transmit pulses to said interrogator representative of an identifying code whereby said transponder can be identified by said interrogator means, and means responsive to said second signal for identifying said transponder proximate said exit means so that the entry of an automobile may be allowed at least at times only in response to the prior occurrence of said second signal indicating prior exit of a transponder whereby passing back of said transponder from automobile to automobile at said entry permitting means is ineffective to permit entry of more than the first such automobile.

56. An identifying system according to claim 55 wherein said characteristic is the amplitude of said pulses.

57. A vehicle identification system according to claim 10 wherein said interrogator portion is positioned above said windshield of said vehicles.

* * * * *

UNITED STATES PATENT AND TRADEMARK OFFICE
CERTIFICATE OF CORRECTION

PATENT NO. : 4,025,791
DATED : May 24, 1977
INVENTOR(S) : JOHN W. LENNINGTON and STANLEY R. STERNBERG It is certified that error appears in the above-identified patent and that said Letters Patent are hereby corrected as shown below:

Column 1, lines 27-28, "intergrator to yield interrogator identifying" should be --interrogator to yield an identifying--.
Column 4, line 41, "comrprising" should be --comprising--.
Column 8, line 14, "Q1 and Q1" should be --Q1 and Q2--.
Column 9, line 41, "bit" should be --bits--.
Column 10, line 63, "68" should be --66--.
Column 12, line 26, "furthr" should be --further--.
Column 16, line 45, after "operational" insert --amplifier--.
Column 18, line 42, "elimimated" should be --eliminated--.
Column 18, line 43, "dynanmic" should be --dynamic--.
Column 22, line 60, (Claim 10, line 17), "interrogated" should be --interrogator--.
Column 25, line 25, (Claim 28, line 2), "reposive" should be --responsive--.
Column 29, lines 14-17, (Claim 53, line 46), after "permitting" insert --means--.

Signed and Sealed this

Twenty-fourth Day of October 1978

[SEAL]

Attest:

RUTH C. MASON
Attesting Officer

DONALD W. BANNER
Commissioner of Patents and Trademar